United States Patent
Takagi

(10) Patent No.: US 9,197,922 B2
(45) Date of Patent: Nov. 24, 2015

(54) INFORMATION PROCESSING SYSTEM, INFORMATION PROCESSING APPARATUS, AND INFORMATION PROCESSING METHOD

(75) Inventor: Tsuyoshi Takagi, Kanagawa (JP)

(73) Assignee: Sony Corporation (JP)

( * ) Notice: Subject to any disclaimer, the term of this patent is extended or adjusted under 35 U.S.C. 154(b) by 437 days.

(21) Appl. No.: 13/110,326

(22) Filed: May 18, 2011

(65) Prior Publication Data

US 2011/0295971 A1 Dec. 1, 2011

(30) Foreign Application Priority Data

May 25, 2010 (JP) ................................ P2010-119025

(51) Int. Cl.
*G06F 13/00* (2006.01)
*H04N 21/4223* (2011.01)
*H04N 21/422* (2011.01)
*H04N 21/433* (2011.01)
*H04N 21/462* (2011.01)

(52) U.S. Cl.
CPC ......... *H04N 21/4223* (2013.01); *H04N 21/422* (2013.01); *H04N 21/4334* (2013.01); *H04N 21/462* (2013.01)

(58) Field of Classification Search
CPC .............. H04N 21/422; H04N 21/462; H04N 21/4334; H04N 21/4223
USPC ........................ 709/217–219, 223; 725/39–55
See application file for complete search history.

(56) References Cited

U.S. PATENT DOCUMENTS

| | | | |
|---|---|---|---|
| 6,199,099 B1* | 3/2001 | Gershman et al. | 709/203 |
| 8,219,670 B2* | 7/2012 | Agrawala et al. | 709/224 |
| 2008/0155587 A1* | 6/2008 | Sokola et al. | 725/34 |
| 2009/0125584 A1* | 5/2009 | Agrawala et al. | 709/203 |
| 2011/0283319 A1* | 11/2011 | Davis et al. | 725/39 |
| 2011/0283322 A1* | 11/2011 | Hamano | 725/44 |

FOREIGN PATENT DOCUMENTS

JP         2009290631 A    12/2009

* cited by examiner

*Primary Examiner* — Kenneth R Coulter
(74) *Attorney, Agent, or Firm* — Lerner, David, Littenberg, Krumholz & Mentlik, LLP

(57) ABSTRACT

Provided is an information processing system including a first information processing apparatus and a second information processing apparatus. The first information processing apparatus includes a content recording unit to record a content and to obtain and record a sights keyword related to the recorded content. The second information processing apparatus includes a place-name accumulating unit to obtain and accumulate place-name information corresponding to a current location of the second information processing apparatus, a sights keyword acquisition unit to obtain the sights keyword recorded on the first information processing apparatus, a sights keyword determining unit to narrow down a sights candidate in the place-name information, to thereby extract sights-candidate place-name information, and to determine the sights keyword corresponding to the sights-candidate place-name information, and a content-record informing unit to inform that a content related to the determined sights keyword is recorded on the first information processing apparatus.

14 Claims, 21 Drawing Sheets

```
                                                    ┌─1112a
┌─────────────────────────────────────────────────┐
│ Program ID: 1                                   │
│ 00:00:02 Today's feature is Okinawa tour.       │
│ I am going to introduce you to Okinawa's tourist spots. │
│ 00:00:05 Now, I am in XYZ aquarium.             │
└─────────────────────────────────────────────────┘
```

FIG.3

```
                                                    ┌─1113a
┌─────────────────────────────────────────────────┐
│ Program ID: 1                                   │
│ Start time: 2010/01/15 20:00                    │
│ Title: Japan tour                               │
│ Program explanation: Tour around Okinawa's tourist spots. │
│ Okinawa's world, XYZ aquarium, popular spots will be introduced. │
│ Play URL: http://xxx.com/title/001              │
└─────────────────────────────────────────────────┘
```

FIG.4

<Keyword> XYZ aquarium </Keyword>
<Program ID> 1 </Program ID>
<Time code> 00 minute 05 seconds </Time code>
<Play URL> http://www.xxx.com/xxx </Play URL>
<GPS information> xxxx </GPS information>

221

| Time | Place-name | Sights candidate |
|---|---|---|
| 01/08 08:00 | Shinagawa station | NO |
| 02/02 08:00 | Shinagawa station | NO |
| 02/03 08:00 | Shinagawa station | NO |
| 02/04 08:00 | Shinagawa station | NO |
| 02/01 08:00 | Shinagawa station | NO |
| 02/06 08:00 | Shinagawa station | NO |
| 02/07 08:00 | Shinagawa station | NO |
| 02/08 08:00 | XYZ aquarium | YES |

FIG.12

| Time | Place-name |
|---|---|
| 02/08 08:00 | XYZ aquarium |

INFORMATION PROCESSING SYSTEM, INFORMATION PROCESSING APPARATUS, AND INFORMATION PROCESSING METHOD

CROSS-REFERENCE TO RELATED APPLICATION

The present application claims priority from Japanese Patent Application No. JP 2010-119025 filed in the Japanese Patent Office on May 25, 2010, the entire content of which is incorporated herein by reference.

BACKGROUND

The present disclosure relates to an information processing system, an information processing apparatus, and an information processing method, which are capable of receiving and recording a content.

In recent years, information processing apparatuses such as a personal computer (PC), a cellular phone, and a personal digital assistant (PDA) have been more and more decreased in size and weight, and such information processing apparatuses can be connected to the Internet from the outside home so as to browse web pages, videos, and the like, which offer information about a destination. Further, with an information processing apparatus equipped with a camera, it is also possible to save image data captured in the outside home by the use of the camera, and to transfer the image data via a network to terminals of other users.

By the way, there has been proposed a system in which a user can utilize positional information of an image, that the user captured in the outside home in the past, to extract a broadcast program corresponding to a preference of the user from electronic program guide (EPG) data, and to record the extracted broadcast program. In this system, positional information (latitude and longitude information) related to a broadcast program is recorded on the EPG data. When the positional information of the image that the user was captured in the outside home in the past is compared with the positional information of the EPG data, a programmed recording of the broadcast program related to the location where the user captured the image in the past is performed (for example, see Japanese Patent Application Laid-open No. 2009-290631 (paragraph [0005], FIG. 1) (hereinafter, referred to as Patent Document 1).

SUMMARY

The system as in Patent Document 1 determines a broadcast program related to the location where the user captured the image in the past in such a manner that the positional information of the image that the user was captured in the past is compared with the positional information of the EPG data. Here, the photographing activity itself by the user is contributed to generate the preference information of the user. Thus, a difference in frequency of the photographing activity between the users is easy to be reflected to the results of this service. That is, a user who does not frequently capture images may not satisfactorily enjoy this service. For this reason, there is desired a system capable of satisfactorily collecting the preference information of the users without depending on action such as the photographing activity, which may cause the difference in frequency between the users, so as to determine a broadcast program corresponding to a preference of each of the users.

In addition, in the case where a broadcast program corresponding to a preference of the user is recorded on a recording apparatus at home, the user view the recorded program at home, generally. On the other hand, when the user visits a sight during a tour or the like, if the user is allowed to view a recorded program related to the sight, it is possible to provide the user with useful information, and thus it is possible to increase the enjoyment of the tour of the user. However, when the user visits the sight for the tour, the user may not view the recorded program recorded by the recording apparatus at home, and even may not know that the program related to the sight is recorded.

In view of the above-mentioned circumstances, there is a need for providing an information processing system, an information processing apparatus, and an information processing method, which allows the user to know that a broadcast program related to a place where the user is in the outside home is recorded, and to view the recorded program as necessary.

In order to achieve the above-mentioned object, an information processing system according to an embodiment of the present disclosure includes a first information processing apparatus and a second information processing apparatus configured to be connectable via a network to the first information processing apparatus.

The first information processing apparatus includes a content recording unit configured to record a content and to obtain and record a sights keyword related to the recorded content.

The second information processing apparatus includes a place-name accumulating unit, a sights keyword acquisition unit, a sights keyword determining unit, and a content-record informing unit.

The place-name accumulating unit obtains and accumulates place-name information corresponding to a current location of the second information processing apparatus.

The sights keyword acquisition unit obtains the sights keyword recorded on the first information processing apparatus.

The sights keyword determining unit narrows down a sights candidate in the place-name information, to thereby extract sights-candidate place-name information, and determines the sights keyword corresponding to the sights-candidate place-name information.

The content-record informing unit informs that a content related to the determined sights keyword is recorded on the first information processing apparatus.

With this, for example, in the case where the user with the second information processing apparatus sightsees, in the timing when the user comes by near a sight that was introduced in a program recorded on the first information processing apparatus, the second information processing apparatus is capable of informing the user of the presence of the content recorded on the first information processing apparatus.

The first information processing apparatus further includes an electronic-program-guide acquisition unit configured to obtain electronic program guide data including information about a plurality of contents.

The content recording unit performs at least one of an extraction of the sights keyword from caption data included in the recorded content, and an extraction of the sights keyword from the information about the recorded content in the electronic program guide data obtained by the electronic-program-guide acquisition unit.

The content recording unit extracts sights keywords with respect to the same content from both of the caption data and the electronic program guide data, and hence it is possible to extract more sights keywords.

The place-name accumulating unit obtains a global positioning system (GPS) information corresponding to the current location of the second information processing apparatus, and obtains place-name information based on the obtained GPS information.

With this, it is possible to satisfactorily collect the place-name information without depending on action, which may cause a difference in frequency between the users, and to determine a content related to the sights, that the user visited in the past, of the broadcast program.

The sights keyword determining unit determines place-name information obtained by removing place-name information appearing on a regular basis in time, as a result of the narrowing of the sights-candidate place-name information.

With this, the place-name that the user visits on a regular basis is removed from the sights candidates, and hence the place-name corresponding to a preference of the user is narrowed down as a sights candidate. Thus, it is possible to increase the accuracy for narrowing down the sights candidate.

The second information processing apparatus further includes a reproduction unit configured to obtain via the network the content recorded on the first information processing apparatus and reproduce the content.

With this, for example, in the case where the user with the second information processing apparatus sightsees, in the timing when the user comes by near a sight that was introduced in a program recorded on the first information processing apparatus, the second information processing apparatus is capable of reproducing the content recorded on the first information processing apparatus.

The first information processing apparatus further includes a place-name acquisition unit and a programmed-recording unit.

The place-name acquisition unit obtains the sights-candidate place-name information from the second information processing apparatus.

The programmed-recording unit detects information about the content including the sights-candidate place-name information from the electronic program guide data obtained by the electronic-program-guide acquisition unit, and carries out a programmed recording based on the detected information about the content.

With this, it is possible to automatically record a content related to the sight, that the user visited in the past, on the first information processing apparatus.

The first information processing apparatus further includes a place-name information determining unit and a place-name information informing unit.

The place-name information determining unit extracts place-name information from caption data included in the content to be reproduced by the reproduction unit of the second information processing apparatus, as caption place-name information, to thereby determine caption place-name information corresponding to the sights-candidate place-name information.

The place-name information informing unit informs that the determined caption place-name information is included in the content to be reproduced by the reproduction unit.

With this, it is possible to inform the user of the fact that it is a scene related to the sight, that the user visited in the past, during reproducing the content recorded on the first information processing apparatus.

An information processing apparatus according to an embodiment of the present disclosure includes a content recording unit, a connection unit, a place-name acquisition unit, and a programmed-recording unit.

The content recording unit records a content and obtains and records a sights keyword related to the recorded content.

The connection unit is connectable via a network to an information processing terminal including a place-name accumulating unit configured to obtain and accumulate place-name information corresponding to a current location, a sights keyword acquisition unit configured to obtain the sights keyword recorded on the content recording unit, a sights keyword determining unit configured to narrow down a sights candidate in the place-name information, to thereby extract sights-candidate place-name information, and to determine the sights keyword corresponding to the sights-candidate place-name information, and a content-record informing unit configured to inform that a content related to the determined sights keyword is recorded on the first information processing apparatus.

The place-name acquisition unit obtains sights-candidate place-name information from the information processing terminal.

The programmed-recording unit detects information about a content including the sights-candidate place-name information from the electronic program guide data obtained by the electronic-program-guide acquisition unit, and carries out a programmed recording based on the information about the detected content.

The information processing terminal further includes a reproduction unit configured to obtain via the network the content recorded on the first information processing apparatus and reproduce the content.

The information processing apparatus further includes a place-name information determining unit and a place-name information informing unit.

The place-name information determining unit extracts place-name information from caption data included in the content to be reproduced by the reproduction unit of the information processing terminal, as caption place-name information, to thereby determine caption place-name information corresponding to the sights-candidate place-name information.

The place-name information informing unit informs that the determined caption place-name information is included in the content to be reproduced by the reproduction unit.

An information processing apparatus according to an embodiment of the present disclosure includes a content recording unit, a place-name accumulating unit, a sights keyword determining unit, and a content-record informing unit.

The content recording unit records a content and obtains and records a sights keyword related to the recorded content.

The place-name accumulating unit obtains and accumulates place-name information corresponding to a current location.

The sights keyword determining unit narrows down a sights candidate in the place-name information, to thereby extract sights-candidate place-name information, and determines the sights keyword corresponding to the sights-candidate place-name information.

The content-record informing unit informs that a content related to the determined sights keyword is recorded on the content recording unit.

According to the embodiments of the present disclosure, it is possible to record a content corresponding to a preference of the user, and further to utilize the content depending on the activity of the user in the timing corresponding to the activity of the user.

These and other objects, features and advantages of the present disclosure will become more apparent in light of the

BRIEF DESCRIPTION OF DRAWINGS

FIG. 3 is a view showing an example of already-recorded-program caption data 1112a to be saved on a caption data saving unit 1112;

FIG. 4 is a view showing an example of recording-history data 1113a to be saved on a recording-history data saving unit 1113;

FIG. 12 is a view showing an example of terminal-side place-name logs 221 stored on a terminal-side place-name log storage unit 220;

DETAILED DESCRIPTION OF EMBODIMENTS

Hereinafter, embodiments of the present disclosure will be described with reference to the drawings.

First Embodiment

Figure 1:
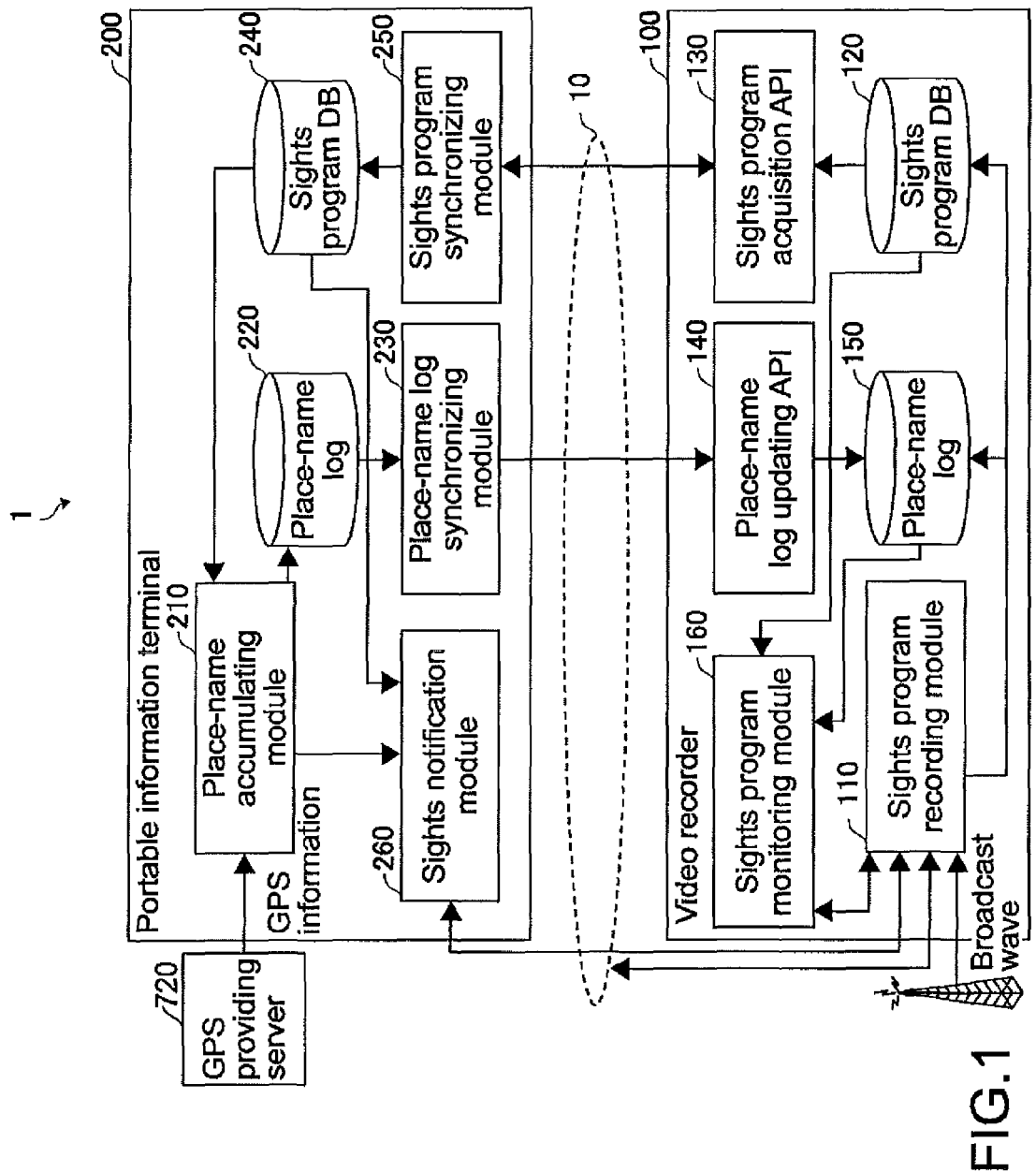
FIG. 1 is a block diagram showing a configuration of an information processing system 1 according to a first embodiment of the present disclosure.

FIG. 1 is a block diagram showing a configuration of an information processing system 1 according to a first embodiment of the present disclosure.

As shown in the drawing, this information processing system 1 includes a video recorder 100 (first information processing apparatus, information processing apparatus, recording apparatus), a portable information terminal 200 (second information processing apparatus, information processing apparatus, information processing terminal), and an Internet 10 (network).

[Video Recorder 100]

The video recorder 100 is capable of receiving content data of programs provided through broadcast waves of a terrestrial digital broadcasting and a satellite broadcasting, and of recording the content data on a recording medium such as a digital versatile disc (DVD) or a Blu-ray disc (registered trade mark) (BD).

The video recorder 100 includes a sights program recording module 110, a recorder-side sights program database 120, a sights program acquisition application program interface (API) 130, a place-name log updating API 140, a recorder-side place-name log storage unit 150, and a sights program monitoring module 160.

When the user selects a broadcast program or the sights program monitoring module 160 notifies the sights program recording module 110 of a broadcast program, the sights program recording module 110 (content recording unit) records the broadcast program. Then, the sights program recording module 110 extracts sights keywords from information about the recorded program which is included in electronic program guide data (EPG data) obtained through the Internet 10 by the use of a network connection unit 603 (electronic-program-guide acquisition unit), and from caption data multiplexed in the entity data of the program. After that, the sights program recording module 110 registers those sights keywords, the latitude and longitude data of the sights, and the like on the recorder-side sights program database 120.

The recorder-side sights program database 120 is a database in which the sights keywords, a program ID, a time, a play URL, the latitude and longitude data, and the like, which are extracted by the sights program recording module 110, are accumulated.

The sights program acquisition API 130 is an API for providing the content of the recorder-side sights program database 120 to a sights program synchronizing module 250 of the portable information terminal 200 in an extensible markup language (XML) format.

When the place-name log updating API 140 (place-name acquisition unit) is called by a place-name log synchronizing module 230 of the portable information terminal 200, the place-name log updating API 140 obtains, from the place-name log synchronizing module 230, place-name information (sights-candidate place-name information) with sights candidate flags being set among the place-name logs collected by the portable information terminal 200. Then, the place-name log updating API 140 accumulates the place-name information in the recorder-side place-name log storage unit 150 as recorder-side place-name logs 151.

The recorder-side place-name log storage unit 150 is a section storing the sights-candidate place-name information obtained by the place-name log synchronizing module 230 of the portable information terminal 200 and the recorder-side place-name logs 151 including time information described in time sequence. The sights-candidate place-name information described in the recorder-side place-name logs 151 accumulated by the recorder-side place-name log storage unit 150 is compared with place-name keywords extracted from the EPG data and the caption data accumulated in the recorder-side sights program database 120, in the sights program monitoring module 160. The sights program recording module 110 is notified of the matching program as a programmed-recording target program.

The sights program monitoring module 160 (programmed-recording unit) obtains the EPG data via the Internet 10 through the network connection unit 603 (electronic-program-guide acquisition unit). Based on genre information associated with the EPG data, the sights program monitoring module 160 detects a program related to the sights. Further, the sights program monitoring module 160 divides the program information extracted from the EPG data into morphemes. When a morpheme corresponds to the place-name information recorded on the recorder-side place-name logs 151 stored on the recorder-side place-name log storage unit 150, the sights program monitoring module 160 notifies the sights program recording module 110 of that program as a programmed-recording target program. It should be noted that the program related to the sights refers to a program whose title includes a place-name or a keyword of "tourist" or "tour," for example. When the user makes a setting that a sights program recording is performed in advance, the sights program recording module 110 becomes effective. The effective sights program recording module 110 executes a detection of the program related to the sights based on the EPG data regularly obtained.

Further, when the recorded program is reproduced, the sights program monitoring module 160 (place-name information determining unit, place-name information informing unit) divides the caption data about that program into morphemes. When a morpheme corresponds to the sights-candidate place-name information recorded on the recorder-side place-name logs 151 stored on the recorder-side place-name log storage unit 150, the sights program monitoring module 160 notifies the user of the sights-candidate place-name information and the time information associated to the sights-candidate place-name information by displaying a pop-up window.

[Portable Information Terminal 200]

The portable information terminal 200 is an electronic apparatus capable of connecting to the Internet 10 so as to browse web pages, transmit and receive electronic mails, reproduce moving images and music, and utilize other applications. The portable information terminal 200 has a GPS function of regularly receiving the positional information (latitude and longitude information) of the portable information terminal 200. Thus, the portable information terminal 200 is capable of obtaining a place-name by utilizing a place-name search service on the web based on the positional information obtained by the use of this GPS function, to thereby accumulate the history of the place-names of the destinations of the user as the place-name logs.

The portable information terminal 200 includes a place-name accumulating module 210, a terminal-side place-name log storage unit 220, a place-name log synchronizing module 230, a terminal-side sights program database 240, a sights program synchronizing module 250, and a sights notification module 260.

The place-name accumulating module 210 (place-name accumulating unit) uses the GPS function to regularly obtain from a GPS providing server 720 the positional information (latitude and longitude information). Further, the place-name accumulating module 210 obtains the place-name information corresponding to the positional information by utilizing the service on the web, to thereby update terminal-side place-name logs 221 of the terminal-side place-name log storage unit 220.

Further, the place-name accumulating module 210 (sights keyword determining unit) removes place-names appearing on a regular basis or on a continuous basis in time in the terminal-side place-name logs 221. When the place-name corresponding to the current positional information is a place-name other than the place-names appearing on a regular basis or on a continuous basis in time in the terminal-side place-name logs 221, the place-name accumulating module 210 narrows down the place-name corresponding to the current positional information as a sights candidate, and extracts the sights-candidate place-name information. Then, the place-name accumulating module 210 sets, with respect to the terminal-side place-name logs 221, flag information indicating that the current place-name information corresponding to the positional information is the sights candidate. In addition, the place-name accumulating module 210 determines whether the narrowed-down sights-candidate place-name information (place-name corresponding to current positional information) is registered on the terminal-side sights program database 240, and, in the case where the narrowed-down sights-candidate place-name information is registered, notifies the sights notification module 260 of its keywords and sights-related information.

The terminal-side place-name log storage unit 220 is a section storing the terminal-side place-name logs 221 including the place-name information described in time sequence, the place-name information being regularly obtained by the place-name accumulating module 210.

When the place-name log synchronizing module 230 refers to the terminal-side place-name logs 221 stored on the terminal-side place-name log storage unit 220, and the place-name information (sights-candidate place-name information) with the sights candidate flags being set to ON exists, the place-name log synchronizing module 230 calls the place-name log updating API 140 of the video recorder 100 and transmits the place-name information (sights-candidate place-name information) with the sights candidate flags being set to ON to the place-name log updating API 140 of the video recorder 100.

Similarly to the recorder-side sights program database 120 of the video recorder 100, the terminal-side sights program database 240 is a database in which the positional information, the sights keywords, the program ID, a time code, the play URL, and the like for each of the sights are accumulated as sights-related information 241.

The sights program synchronizing module 250 (sights keyword acquisition unit) obtains the content of the recorder-side sights program database 120 transmitted in the XML format from the sights program acquisition API 130 of the video recorder 100, and reflects the content into the terminal-side sights program database 240.

Based on the positional information obtained by the use of the GPS function of the place-name accumulating module, the sights notification module 260 (content-record informing unit) searches for the sights-related information 241 corresponding to the current location of the user (portable information terminal 200) from the terminal-side sights program database 240. Further, the sights notification module 260 notifies the user of the fact that the recorded program related to the sights corresponding to the current location of the user (portable information terminal 200) is recorded on the video recorder 100 and this recorded program can be obtained from the video recorder 100 and can be reproduced in the portable information terminal 200.

Further, the sights notification module 260 (reproduction unit) obtains the recorded program recorded on the video recorder 100 via the Internet 10, and reproduces the obtained recorded program.

[Video Recorder 100: Sights Program Recording Module 110]

Figure 2:
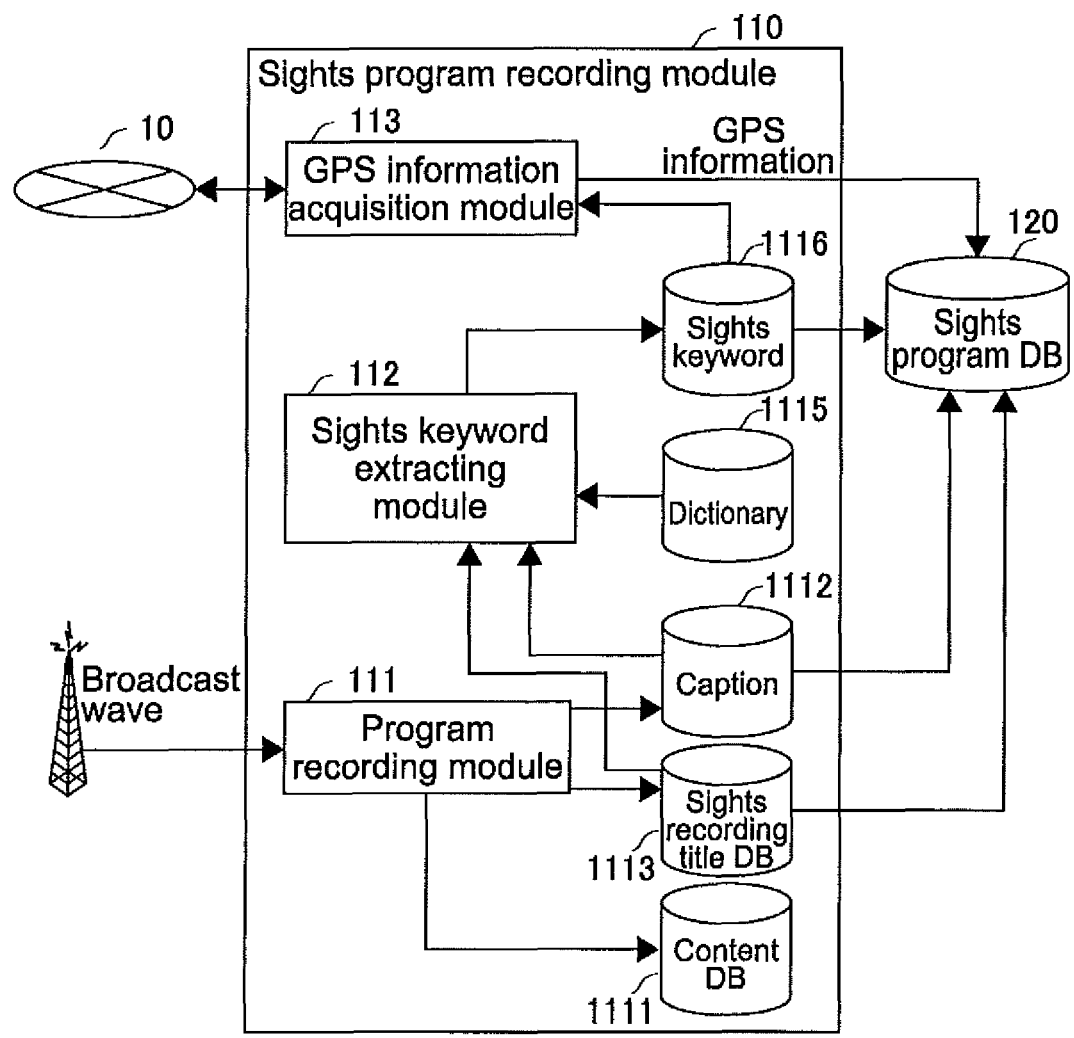
FIG. 2 is a block diagram showing a configuration of a sights program recording module 110.

FIG. 2 is a diagram showing a configuration of the sights program recording module 110.

As shown in the drawing, the sights program recording module 110 includes a program recording module 111, a sights keyword extracting module 112, and a GPS information acquisition module 113.

[Video Recorder 100: Sights Program Recording Module 110: Program Recording Module 111]

The program recording module 111 is a module executing a recording of a broadcast program depending on a preference of the user. More specifically, the program recording module 111 detects a broadcast program corresponding to a preference of the user from the EPG data, which is obtained via the Internet 10 through the network connection unit 603 (electronic-program-guide acquisition unit), based on preference data set by the user in advance, and executes a recording of the broadcast program by the use of a programmed recording. Further, the program recording module 111 executes a recording of a broadcast program corresponding to a preference of the user based on the EPG data, which is detected and programmed-recorded by the sights program monitoring module 160. When the user specifies a recording of a program during viewing the program, the program recording module 111 is also capable of executing a recording of the broadcast program.

The program recording module 111 records the entity data of the broadcast program on a content storage unit 1111, and extracts the caption data multiplexed in the entity data of the broadcast program. Further, program recording module 111 saves them on a caption data saving unit 1112 as already-recorded-program caption data 1112*a*. Further, the program recording module 111 extracts data related to the already recorded broadcast program from the EPG data, generates recording-history data 1113*a*, and saves it on a recording-history data saving unit 1113.

It should be noted that the content storage unit 1111 is, for example, a high-capacity volume storage medium such as a hard disc drive (HDD), a solid state drive (SSD), the DVD, or the BD. It is sufficient that the caption data saving unit 1112 and the recording-history data saving unit 1113 be, for example, storage unit apparatuses capable of reading and writing, such as the HDD or the SSD.

FIG. 3 is a view showing an example of the already-recorded-program caption data 1112*a* to be saved on the caption data saving unit 1112.

The already-recorded-program caption data 1112*a* to be saved on the caption data saving unit 1112 includes the program ID for identifying the program, the time, the caption data, and the like. Here, the program ID may be an ID specific to the program, which is included in the EPG data and defined on a program provider side, and may be an ID uniquely added to the broadcast program on the video recorder 100 side. The caption time is a time on the program when the caption data appeared. For example, "00:00:02" means 2 seconds after the start of the program. The caption data is caption data extracted from a transport stream.

FIG. 4 is a view showing an example of the recording-history data 1113*a* to be saved on the recording-history data saving unit 1113.

The recording-history data 1113*a* to be saved on the recording-history data saving unit 1113 includes, for example, the program ID for identifying the program, a start time, a title, a program explanation, a play uniform resource locator (URL), and the like. Here, the program ID may be the ID specific to the program, which is included in the EPG data and defined on the program provider side, and may be the ID specially added to the broadcast program on the video recorder 100 side. The recording start time is a start time of the broadcast program. The title is a title extracted from the EPG data. The program explanation is a program explanation extracted from the EPG data. The play URL is a URL for reproducing the program content via the Internet 10.

Here, the already-recorded-program caption data 1112*a* of FIG. 3 is data generated with respect to a certain broadcast program based on the caption data, and the recording-history data 1113*a* of FIG. 4 is data generated with respect to the same broadcast program based on the EPG data.

As described above, the program recording module 111 is capable of generating data necessary for obtaining the sights keywords with respect to the same broadcast program from both of the caption data and the EPG data, to thereby extract more sights keywords.

[Video Recorder 100: Sights Program Recording Module 110: Sights Keyword Extracting Module 112]

Referring back to FIG. 2, the sights keyword extracting module 112 extracts, from the already-recorded-program caption data 1112*a* saved on the caption data saving unit 1112 and the recording-history data 1113*a* saved on the recording-history data saving unit 1113, words of the sights as the sights keywords through using a sights word dictionary 1115 in which the words of the sights used as standards are stored in advance. Then, the sights keyword extracting module 112 saves the words of the sights on the recorder-side sights program database 120. The sights keyword extracting module 112 may extract the words of the sights from audio data by the use of voice recognition.

Figure 5:
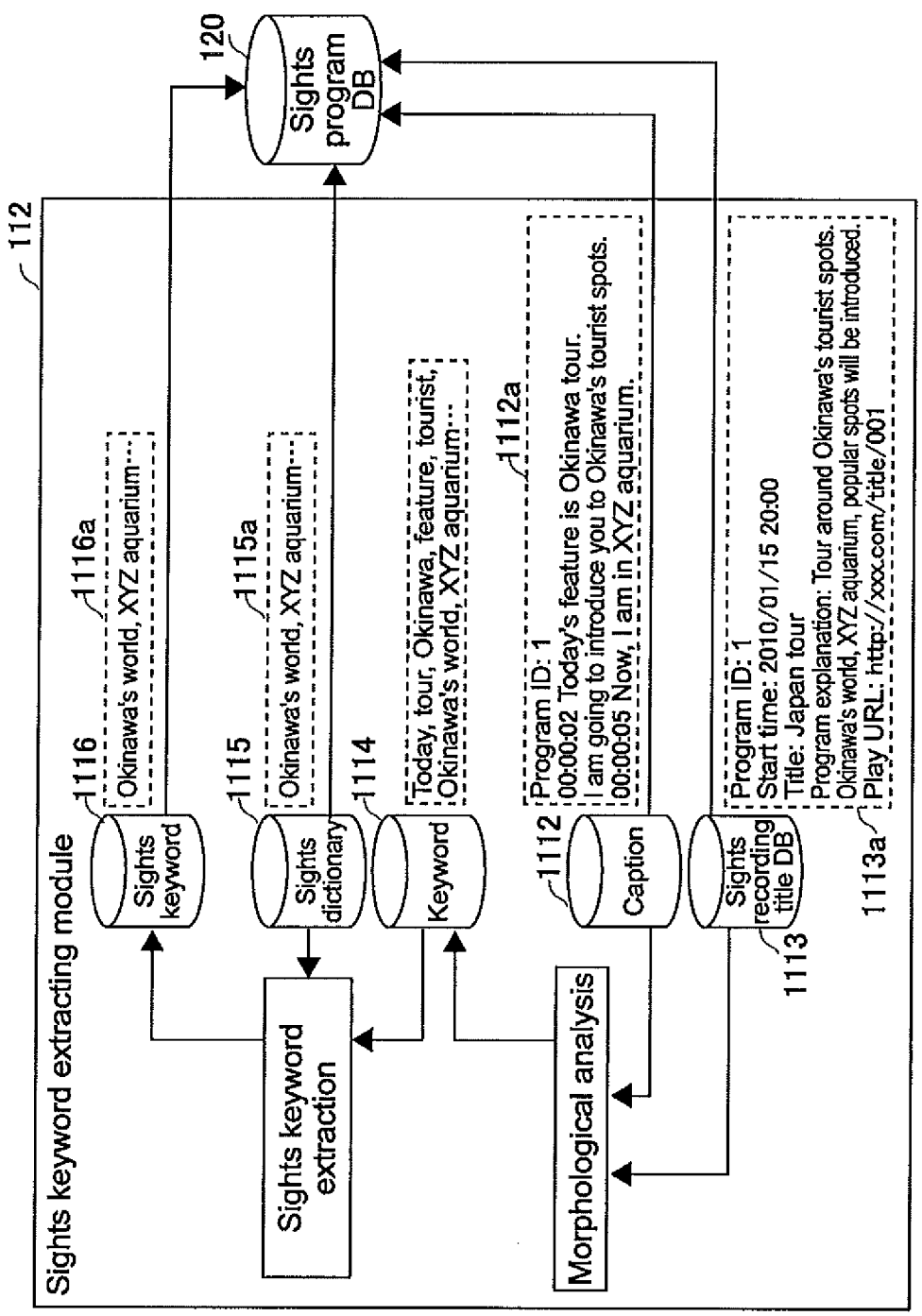
FIG. 5 is a view showing a more detailed configuration example of a sights keyword extracting module 112.

FIG. 5 is a view showing a more detailed configuration of the sights keyword extracting module 112.

The sights keyword extracting module 112 divides the already-recorded-program caption data 1112*a* and the recording-history data 1113*a* respectively saved on the caption data saving unit 1112 and the recording-history data saving unit 1113 into morphemes, and compares each of the morphemes (keywords 1114) with each of the standard sights words 1115*a* stored on the sights word dictionary 1115. The sights keyword extracting module 112 determines the morphemes (keywords 1114), which correspond to the standard sights words 1115*a* stored on the sights word dictionary 1115 in the above-mentioned comparison, as sights keywords 1116*a* as valid words. The sights keyword extracting module 112 saves the sights keywords 1116*a* on a sights keyword saving unit 1116.

It is sufficient that the sights word dictionary 1115 and the sights keyword saving unit 1116 be, for example, storage unit apparatuses capable of reading and writing, such as the HDD or the SSD.

The sights keyword extracting module 112 extracts information to be saved on the recorder-side sights program database 120 from the already-recorded-program caption data 1112*a* saved on the caption data saving unit 1112, the recording-history data 1113*a* saved on the recording-history data saving unit 1113, and the sights keywords 1116*a* saved on the sights keyword saving unit 1116. In this case, the sights keyword extracting module 112 saves all of the sights keywords 1116a, which are saved on the sights keyword saving unit 1116, on the recorder-side sights program database 120, while the sights keywords being each associated with the program ID, the time of the sights keyword (caption time), the play URL, and the like of the program being the extraction source of the sights keyword.

Figure 6:
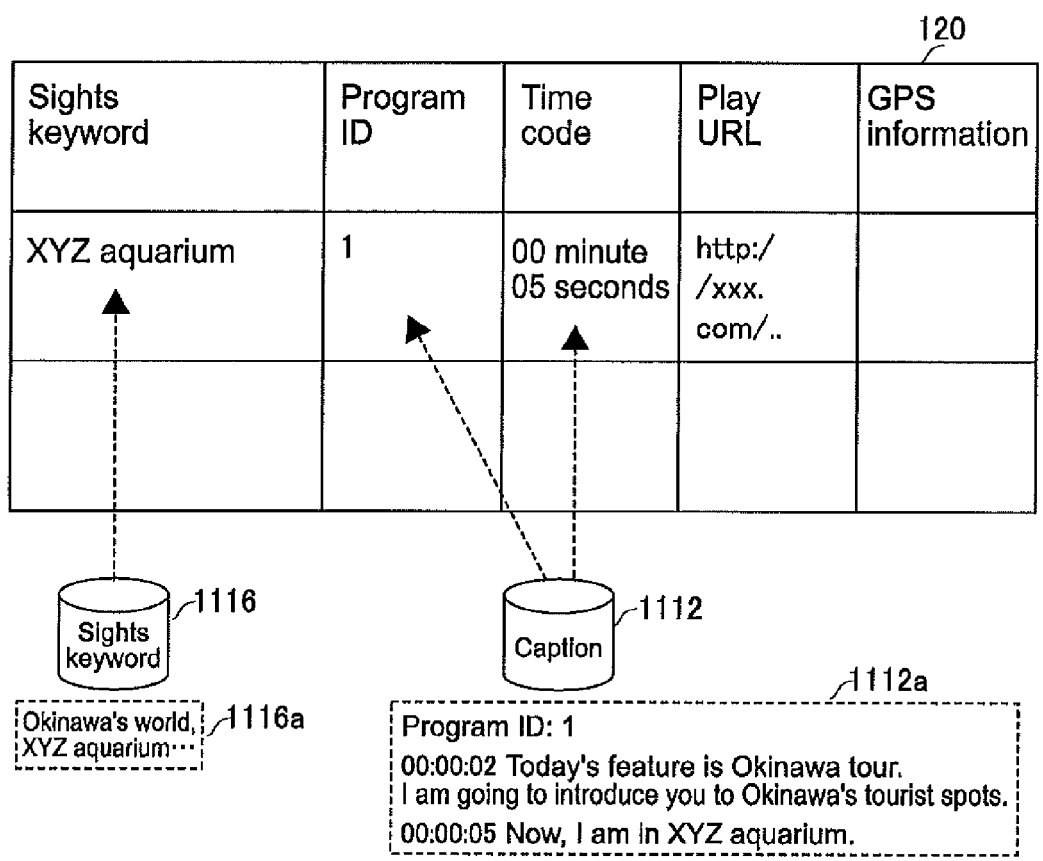
FIG. 6 is a view showing a configuration of a recorder-side sights program database 120.

FIG. 6 is a view showing a configuration of the recorder-side sights program database 120.

As shown in the drawing, the recorder-side sights program database 120 is a database on which the sights keywords, the program ID, the time code, the play URL, the GPS information, and the like are registered while associated with each other. It should be noted that in the case where the time code (caption time) of the sights keyword is not extracted, the value of its item is set to "null." For example, in the case of a sights keyword extracted from the recording-history data 1113a, the appearing time of that sights keyword is unknown, and hence the value of the item of the time code (caption time) of the sights keyword is set to "null." Further, at the time of registration onto the sights program database by the sights keyword extracting module 112, the value of the item of the GPS information is set to "null."

[Video Recorder 100: Sights Program Recording Module 110: GPS Information Acquisition Module 113]

Referring back to FIG. 2, the GPS information acquisition module 113 obtains positional information of the place-name by utilizing a GPS information service on the Internet 10 with respect to the sights keywords 1116a saved on the sights keyword saving unit 1116, and accumulates the positional information in the recorder-side sights program database 120.

Figure 7:
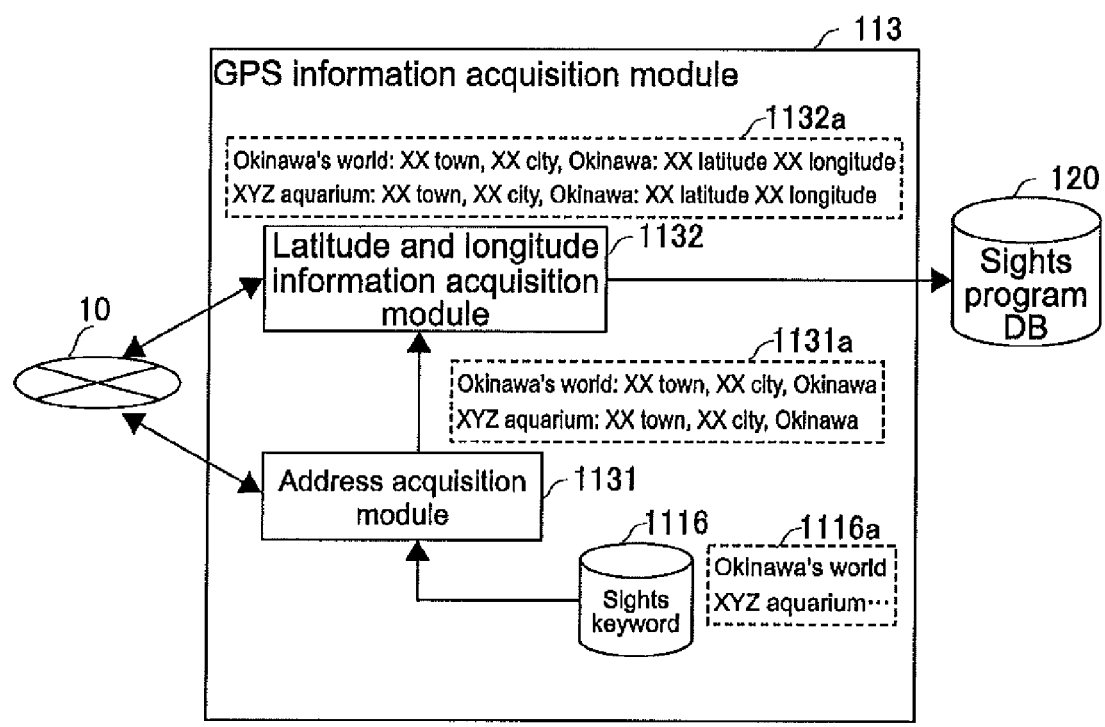
FIG. 7 is a view showing a more detailed configuration example of a GPS information acquisition module 113.

FIG. 7 is a view showing a more detailed configuration example of the GPS information acquisition module 113.

As shown in the drawing, the GPS information acquisition module 113 includes an address acquisition module 1131 and a positional information acquisition module 1132.

The address acquisition module 1131 searches for addresses 1131a corresponding to the sights keywords 1116a saved on the sights keyword saving unit 1116 by utilizing an address information service on the Internet 10.

The positional information acquisition module 1132 searches for latitude and longitude information 1132a corresponding to the addresses 1131a obtained by the address acquisition module 1131 by utilizing the GPS information service on the Internet 10. Then, positional information acquisition module 1132 registers the latitude and longitude information 1132a corresponding to the addresses 1131a on the recorder-side sights program database 120.

Figure 8:
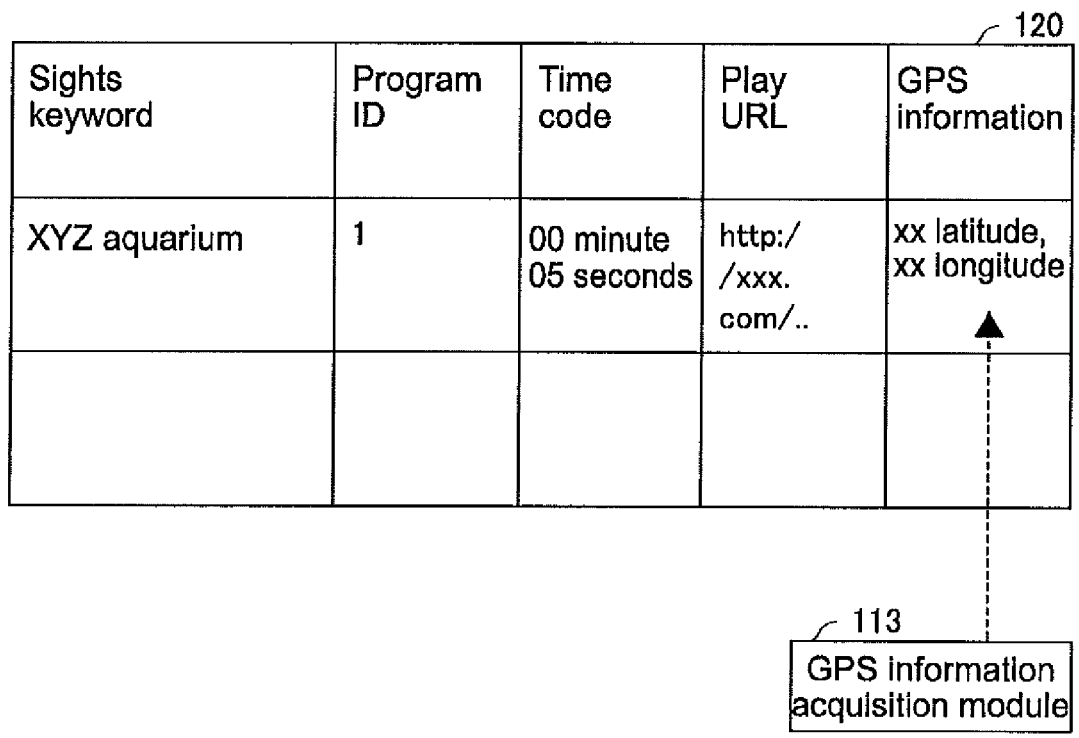
FIG. 8 is a view showing the recorder-side sights program database 120 with latitude and longitude information being added.

FIG. 8 is a view showing the recorder-side sights program database 120 with the latitude and longitude information being added.

[Video Recorder 100: Sights Program Acquisition API 130, Portable Information Terminal 200: Sights Program Synchronizing Module 250]

Figures 9, 10:
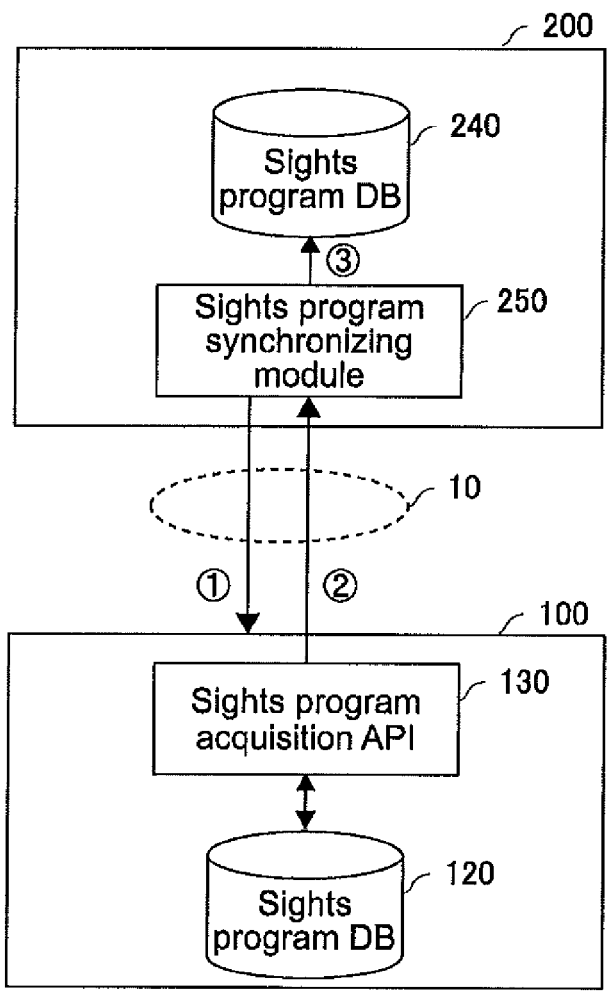
FIG. 9 is a view describing a transmission and a reception between a sights program acquisition API 130 of a video recorder 100 and a sights program synchronizing module 250 of a portable information terminal 200.
FIG. 10 is a view showing a configuration of the sights program data in the XML format.

FIG. 9 is a view for describing a transmission and a reception between the sights program acquisition API 130 of the video recorder 100 and the sights program synchronizing module 250 of the portable information terminal 200.

The transmission and the reception between the sights program acquisition API 130 of the video recorder 100 and the sights program synchronizing module 250 of the portable information terminal 200 is started when the sights program synchronizing module 250 of the portable information terminal 200 calls the sights program acquisition API 130 of the video recorder 100 by the use of an HTTP request (arrow 1 of FIG. 9). Here, the sights program acquisition API 130 supports a representational state transfer (REST), and, in response to the HTTP request from the sights program synchronizing module 250 of the portable information terminal 200, the sights program acquisition API 130 generates sights program data in the XML format based on the sights program data accumulated in the recorder-side sights program database 120 and sends back the sights program data to the sights program synchronizing module 250 of the portable information terminal 200 via the Internet 10 (arrow 2 of FIG. 9). In this case, the HTTP request uses the URL of the sights program acquisition API 130 as a parameter.

FIG. 10 is a view showing a configuration of the sights program data in the XML format.

As can be seen, the sights program data accumulated in the recorder-side sights program database 120 is clarified by the sights program acquisition API 130 by the use of tags in units of a sights keyword element, a program ID element, a time code element, a play URL element, and a GPS information element, and is sent back to the sights program synchronizing module 250 of the portable information terminal 200. It should be noted that "GPS information element" is the latitude and longitude information 1132a registered on the recorder-side sights program database 120.

The sights program synchronizing module 250 of the portable information terminal 200 extracts the respective data elements (sights keyword element, program ID element, time code element, play URL element, GPS information element), which are clarified by the use of the tags, from the XML data from the sights program acquisition API 130 of the video recorder 100, and registers them as the sights-related information 241 on the terminal-side sights program database 240 (arrow 3 of FIG. 9). In this manner, the content of the recorder-side sights program database 120 (see FIG. 8) is reflected on the terminal-side sights program database 240. In other words, the terminal-side sights program database 240 has the same content as that of the recorder-side sights program database 120 (see FIG. 8).

[Portable Information Terminal 200: Place-Name Accumulating Module 210]

Figure 11:
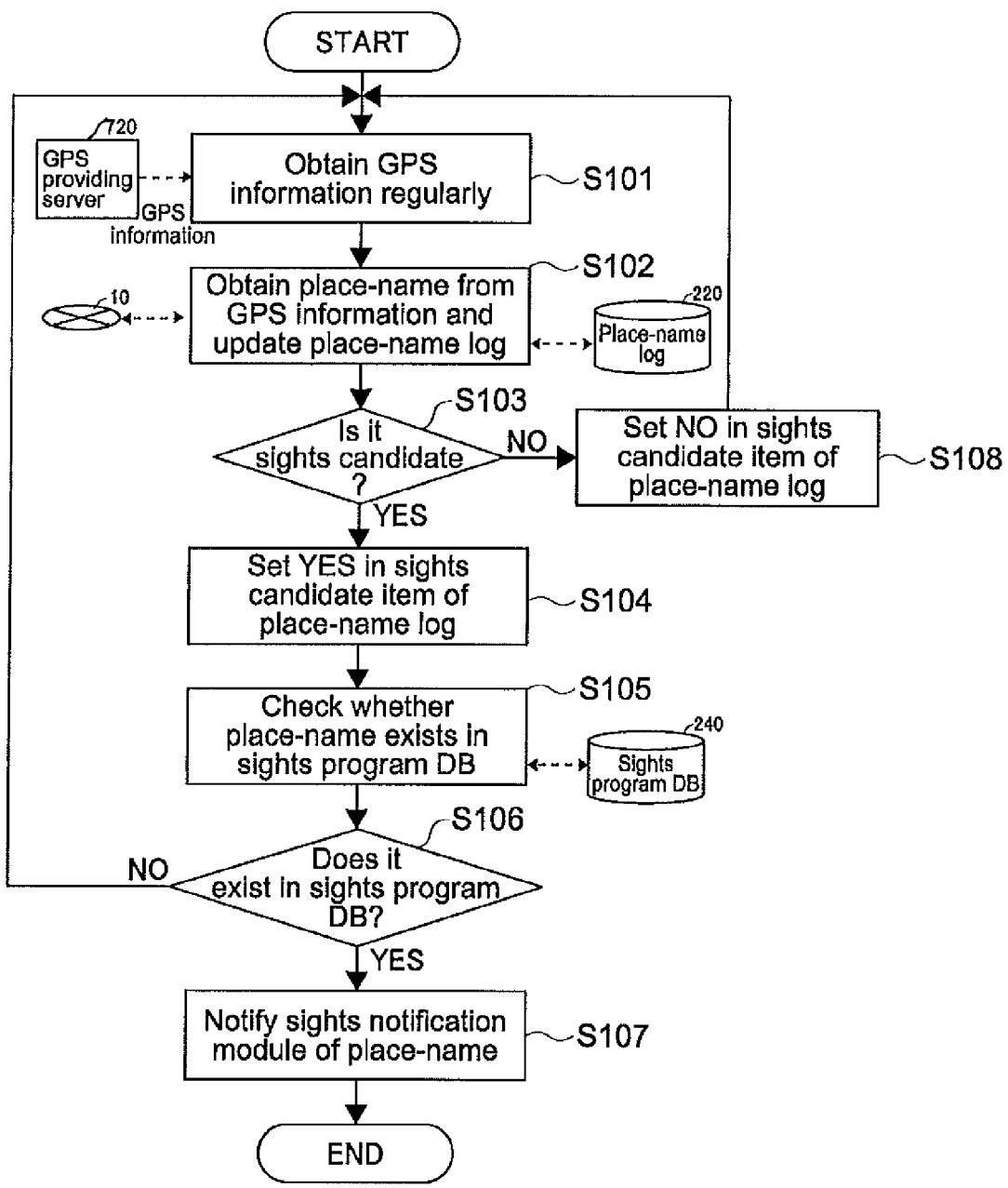
FIG. 11 is a flowchart for describing a function of a place-name accumulating module 210.

FIG. 11 is a flowchart for describing a function of the place-name accumulating module 210.

The place-name accumulating module 210 uses the GPS function to regularly obtain, from the GPS providing server 720, current positional information (latitude and longitude information) (Step S101). The place-name accumulating module 210 searches for the place-name information corresponding to the obtained current positional information by utilizing the information service on the Internet 10, and adds (updates) the place-name being the result of the search and the positional information and the acquisition date and time corresponding to the place-name information to the terminal-side place-name logs 221 stored on the terminal-side place-name log storage unit 220 (Step S102).

The place-name accumulating module 210 removes the place-name information appearing on a regular basis or on a continuous basis in time in the terminal-side place-name logs 221. When the place-name corresponding to the current positional information is place-name information other than the place-name information appearing on a regular basis or on a continuous basis in time in the terminal-side place-name logs 221, the place-name accumulating module 210 narrows down the place-name information corresponding to the current positional information as a sights candidate, and extracts the sights-candidate place-name information (YES at Step S103). Then, the place-name accumulating module 210 sets, with respect to the terminal-side place-name logs 221 stored on the terminal-side place-name log storage unit 220, flag information (YES) indicating that the place-name information corresponding to the current positional information (sights-candidate place-name information) is the sights candidate (Step S104). In addition, the place-name accumulating module 210 determines whether the narrowed-down sights-candidate place-name information (place-name corresponding to the current positional information) is registered on the terminal-side sights program database 240 as a sights keyword (Step S105), and, in the case where the narrowed-down sights-candidate place-name information is registered (YES at Step S106), notifies the sights notification module 260 of the sights keyword and the sights-related information 241 (program ID, time code, play URL, GPS information) (Step S107). In the case where the narrowed-down sights-candidate place-name information is not registered (NO at Step S106), the sequence retunes to Step S101.

It should be noted that, at Step S103, when the place-name information corresponding to the current positional information is the place-name information appearing on a regular basis or on a continuous basis in time in the terminal-side place-name logs 221, the place-name accumulating module 210 determines that the place-name information corresponding to the current positional information is not the sights candidate (NO at Step S103), and the place-name accumulating module 210 sets, with respect to the terminal-side place-name logs 221 stored on the terminal-side place-name log storage unit 220, flag information (NO) indicating that the place-name information corresponding to the current positional information is not the sights candidate before the sequence returns to Step S101 (Step S108).

The place-name accumulating module 210 removes the place-name information appearing on a regular basis or on a continuous basis in time in the terminal-side place-name logs 221, from the sights candidates. With this, the place-name information of places (for example, name of station for commuting) where the user goes regularly is removed from the sights candidates. Therefore, the place-name information corresponding to a preference of the user is narrowed down as the sights candidate, and hence it is possible to increase the accuracy for narrowing down the sights candidate.

Further, the place-name accumulating module 210 uses the GPS function to regularly obtain the current positional information (latitude and longitude information), and the place-name information corresponding to the obtained current positional information. Therefore, it is possible to satisfactorily narrow down the place-name information corresponding to a preference of the user as the sights candidate without depending on action (for example, photography activity), which may cause a difference in frequency between the users, and to determine a broadcast program with respect to the sights candidate.

FIG. 12 is a view showing an example of the terminal-side place-name logs 221 stored on the terminal-side place-name log storage unit 220.

As shown in the drawing, in the terminal-side place-name logs 221 stored on the terminal-side place-name log storage unit 220, one piece of log information includes a recording date and time, place-name information, and a sights candidate flag. The recording date and time is information of the date and time when the place-name information is added to the terminal-side place-name logs 221. The place-name information is place-name information obtained from the information service on the Internet 10 based on the positional information obtained by the use of the GPS function. The sights candidate flag is information indicating that the place-name information is the sights candidate. In the example of the drawing, the place-name information of "Shinagawa station" exists in the terminal-side place-name logs 221 on a continuous basis, and hence the sights candidate flags are set to OFF (NO). On the other hand, the sights candidate flag of the place-name information of "XYZ aquarium" does not exist on a regular basis and on a continuous basis in time, and hence the sights candidate flag is set to ON (YES). Further, the setting of the sights candidate flag is performed also when the user inputs information for specifying the ON setting of the sights candidate flag directly into the information processing apparatus, in addition to the automatic setting based on the regular basis and on the continuous basis in time.

It should be noted that the positional information corresponding to the place-name information is recorded on the terminal-side place-name logs 221 in addition to the place-name and the date and time. At Step S105, when the positional information recorded on the terminal-side place-name logs 221 and the GPS information recorded on the terminal-side sights program database 240 are compared to each other, it is possible to increase the accuracy of the determination at Step S105.

[Portable Information Terminal 200: Sights Notification Module 260]

Figure 13:
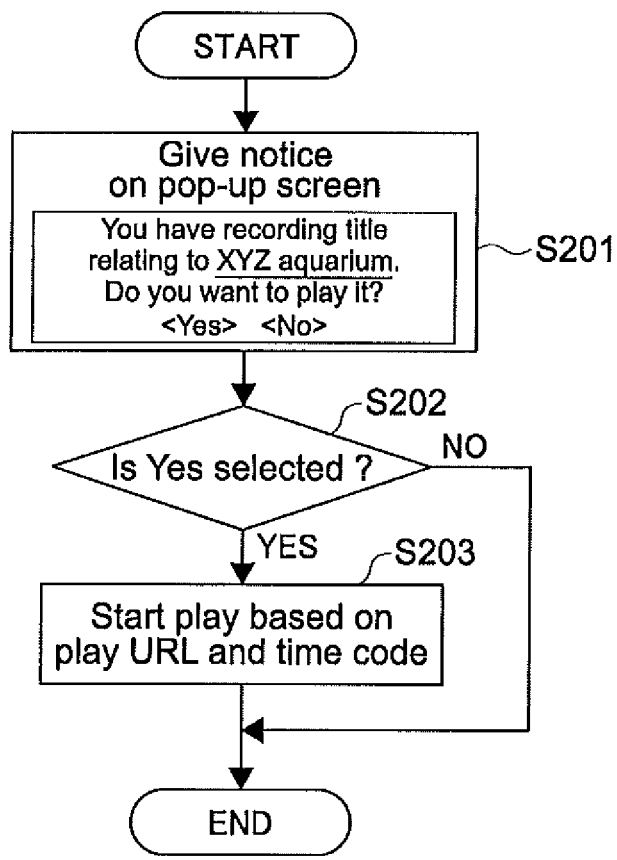
FIG. 13 is a flowchart for describing a function of a sights notification module 260.

FIG. 13 is a flowchart for describing a function of the sights notification module 260.

By displaying a pop-up window, the sights notification module 260 notifies the user of the fact that the program related to the sights keyword (place-name corresponding to the current positional information, which has been determined as the sights candidate), which is notified at Step S107 by the place-name accumulating module 210, is recorded on the video recorder 100 and the recorded program related to the sights can be obtained from the video recorder 100 and can be reproduced in the portable information terminal 200, and of whether or not to reproduce the program (Step S201). For example, when at Step S107, the place-name accumulating module 210 notifies the sights notification module 260 of the sights keyword "XYZ aquarium," the sights notification module 260 displays a pop-up window of "You have recording title relating to XYZ aquarium. Do you want to play it?" so as to notify the user. When the user selects a play (YES at Step S202), the sights notification module 260 obtains via the Internet 10 the recorded program recorded on the video recorder 100 indicated by the use of the play URL included in the sights-related information 241 notified at Step S107 by the place-name accumulating module 210, and reproduces the obtained recorded program from the appearing time indicated by the use of the time code included in the sights-related information 241 (Step S203). It should be noted that when the value of the time code is "null," the recorded program is reproduced from the start.

On the other hand, in the case where the user does not select a play yet after a predetermined period of time is elapsed (NO at Step S202), the sights notification module 260 terminates the process.

With this, for example, in the case where the user with the portable information terminal 200 sightsees, in the timing when the user comes by near a sight that was introduced in a program recorded on the video recorder 100, the portable information terminal 200 is capable of informing the user of the presence of the program recorded on the video recorder 100 and then reproducing the program recorded on the video recorder 100. For example, in the case where the XYZ aquarium was incidentally introduced in the program recorded on the home video recorder 100 in the past, in the timing when the user with the portable information terminal 200 comes by near the XYZ aquarium, the portable information terminal 200 is capable of informing the user of the presence of the recorded program and then reproducing the program if the user desires so.

[Video Recorder 100: Place-Name Log Updating API 140, Portable Information Terminal 200: Place-Name Log Synchronizing Module 230]

Figures 14, 15:
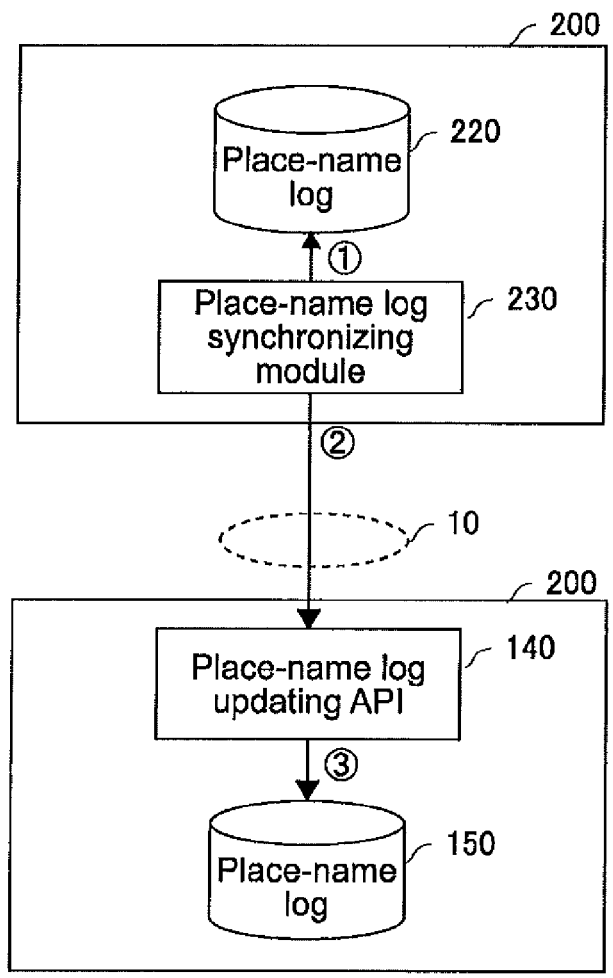
FIG. 14 is a view describing a transmission and a reception between a place-name log updating API 140 of the video recorder 100 and a place-name log synchronizing module 230 of the portable information terminal 200.
FIG. 15 is a view showing an example of recorder-side place-name logs 151 stored on a recorder-side place-name log storage unit 150.

FIG. 14 is a view describing a transmission and a reception between the place-name log updating API 140 of the video recorder 100 and the place-name log synchronizing module 230 of the portable information terminal 200.

The place-name log synchronizing module 230 of the portable information terminal 200 refers to the terminal-side place-name logs 221 stored on the terminal-side place-name log storage unit 220. When the place-name information (sights-candidate place-name information) with the sights candidate flag being set to ON (YES) exists (arrow 1 of FIG. 14), the transmission and the reception between the place-name log updating API 140 of the video recorder 100 and the place-name log synchronizing module 230 of the portable information terminal 200 is started. First, the place-name log synchronizing module 230 of the portable information terminal 200 calls the place-name log updating API 140 of the video recorder 100, and transmits the place-name information (sights-candidate place-name information) and the time information with the sights candidate flag being set to ON to the place-name log updating API 140 (arrow 2 of FIG. 14).

The place-name log updating API 140 of the video recorder 100 obtains sights-candidate place-name information 151a and time information 151b with the sights candidate flag being set to ON from the place-name log synchronizing module 230 of the portable information terminal 200, and records them on the recorder-side place-name logs 151 stored on the recorder-side place-name log storage unit 150 (arrow 3 of FIG. 14).

FIG. 15 is a view showing an example of the recorder-side place-name logs 151 stored on the recorder-side place-name log storage unit 150.

As shown in the drawing, the content of the terminal-side place-name logs 221 (see FIG. 12) is reflected on the recorder-side place-name logs 151.

[Video Recorder 100: Sights Program Monitoring Module 160]

Figure 16:
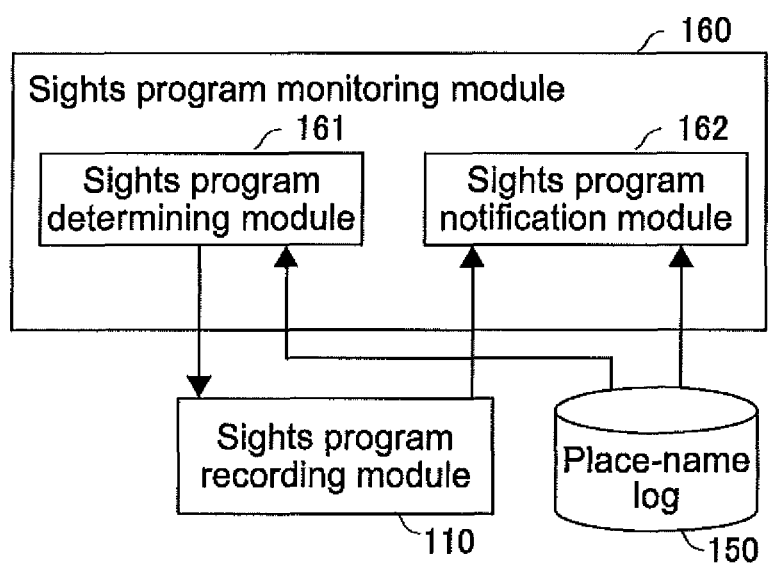
FIG. 16 is a view showing a configuration example of a sights program monitoring module 160.

FIG. 16 is a view showing a configuration example of the sights program monitoring module 160.

As shown in the drawing, the sights program monitoring module 160 includes a sights program determining module 161 (programmed-recording unit) and a sights program notification module 162 (place-name information determining unit, the place-name information informing unit).

[Video Recorder 100: Sights Program Monitoring Module 160: Sights Program Determining Module 161]

Figure 17:
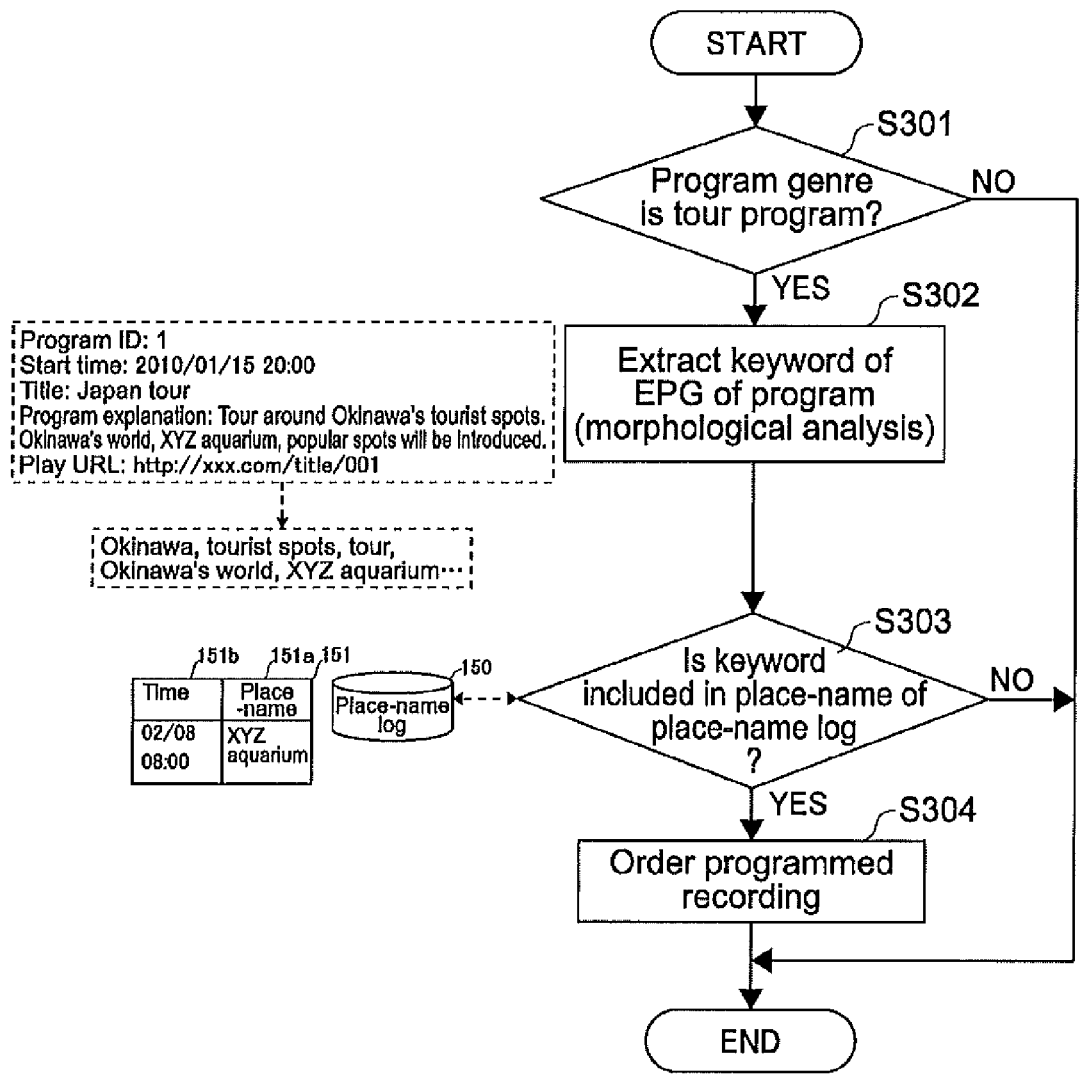
FIG. 17 is a flowchart for describing a function of a sights program determining module 161.

FIG. 17 is a flowchart for describing a function of the sights program determining module 161.

The sights program determining module 161 obtains the EPG data via the Internet 10, and detects, based on the genre information associated with the EPG data, the program related to the sights (YES at Step S301). Then, the sights program determining module 161 divides the program information extracted from the EPG data into morphemes (Step S302). The sights program determining module 161 compares each of the morphemes with the sights-candidate place-name information 151a recorded on the recorder-side place-name logs 151 stored on the recorder-side place-name log storage unit 150 (Step S303). The sights program determining module 161 determines, through the above-mentioned comparison, that a morpheme corresponding to the sights-candidate place-name information 151a recorded on the recorder-side place-name logs 151 exists (YES at Step S303). Then, the sights program determining module 161 notifies the sights program recording module 110 of the program as a programmed-recording target program (Step S304). In this manner, the program determined by the sights program determining module 161 as being the programmed-recording target program is recorded by the sights program recording module 110 on the content storage unit 1111.

For example, when the sights program determining module 161 determines, through the comparison at Step S303, that the morpheme of "XYZ aquarium" corresponding to the sights-candidate place-name information 151a recorded on the recorder-side place-name logs 151 exists, the sights program determining module 161 notifies the sights program recording module 110 of the program indicated by the use of the EPG data including "XYZ aquarium" as the programmed-recording target program. In this manner, the program related to "XYZ aquarium" is recorded by the sights program recording module 110 on the content storage unit 1111.

On the other hand, in the case where the EPG data obtained by the sights program determining module 161 is not the program related to the sight (NO at Step S301), or in the case where the morpheme corresponding to the sights-candidate place-name information 151a recorded on the recorder-side place-name logs 151 does not exist (NO at Step S303), the sights program determining module 161 terminates the process.

With this, it is possible to automatically record the program related to the sights, that the user visited in the past, on the video recorder 100.

[Video Recorder 100: Sights Program Monitoring Module 160: Sights Program Notification Module 162]

Figure 18:
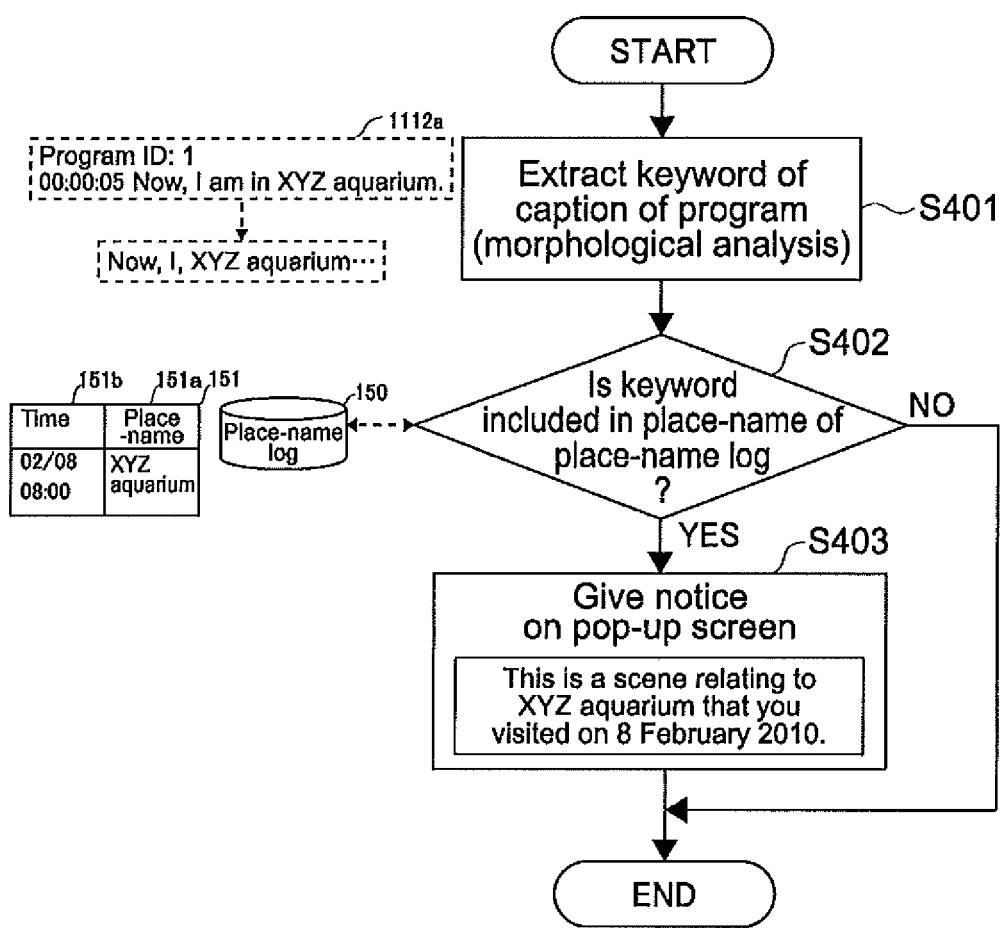
FIG. 18 is a flowchart for describing a function of a sights program notification module 162.

FIG. 18 is a flowchart for describing a function of the sights program notification module 162.

When the program recorded on the content storage unit 1111 is reproduced in the portable information terminal 200, the sights program notification module 162 divides the already-recorded-program caption data 1112a about the program, which is saved on the caption data saving unit 1112, into morphemes (Step S401). Then, the sights program notification module 162 compares each of the morphemes with the sights-candidate place-name information 151a recorded on the recorder-side place-name logs 151 stored on the recorder-side place-name log storage unit 150 (Step S402). The sights program notification module 162 determines, through the above-mentioned comparison, that a morpheme corresponding to the sights-candidate place-name information 151a recorded on the recorder-side place-name logs 151 exists (YES at Step S402). Then, the sights program notification module 162 notifies the user of the corresponding sights-candidate place-name information 151a and the time information 151b associated with the sights-candidate place-name information 151a by displaying a pop-up window (Step S403).

For example, when the sights program notification module 162 determines, through the above-mentioned comparison at Step S402, that the morpheme of "XYZ aquarium" corresponding to the sights-candidate place-name information 151a recorded on the recorder-side place-name logs 151 exists, the sights program notification module 162 notifies the user of the sights-candidate place-name information 151a of "XYZ aquarium" and the time information 151b of "02/08" by displaying a pop-up window of "This is a scene relating to XYZ aquarium that you visited on 8 Feb. 2010."

On the other hand, in the case where the morpheme corresponding to the sights-candidate place-name information 151a recorded on the recorder-side place-name logs 151 does not exist (NO at Step S402), the sights program notification module 162 terminates the process.

With this, during reproducing the program recorded on the video recorder 100, it is possible to notify the user of the fact that it is the scene relating to the sight that the user visited in the past.

[Operation of Video Recorder 100 and Portable Information Terminal 200]

Next, the description will be made of an operation of the video recorder 100 and the portable information terminal 200, which have the above-mentioned functions. It should be noted that the description of the operation will be made in the following order.

1. Place-name recording operation
2. Program recording operation
3. Already-recorded-program reproducing operation

[Place-Name Recording Operation]

Figure 19:
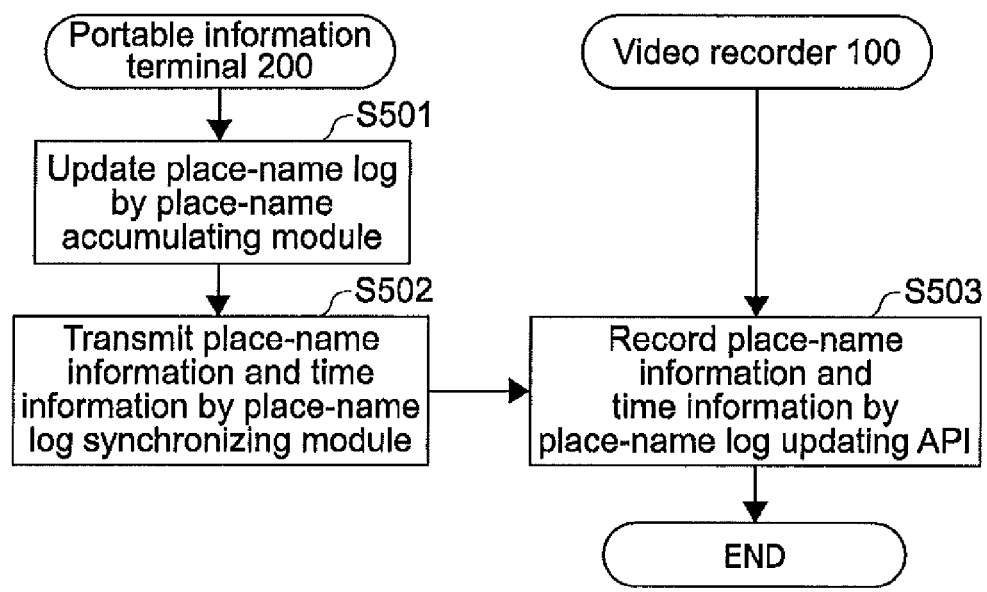
FIG. 19 is a flowchart showing a place-name recording operation.

FIG. 19 is a flowchart showing the place-name recording operation.

The place-name accumulating module 210 of the portable information terminal 200 uses the GPS function to regularly obtain the positional information, obtains the place-name information corresponding to the positional information by utilizing the service on the web, and updates the place-name logs of the terminal-side place-name log storage unit 220. When the place-name information is place-name information other than the place-name information appearing on a regular basis or on a continuous basis in time in the terminal-side place-name logs 221, the place-name accumulating module 210 determines the place-name information as the sights candidate, and sets, with respect to the terminal-side place-name logs 221 stored on the terminal-side place-name log storage unit 220, flag information indicating that the current place-name information corresponding to the positional information is the sights candidate (Step S501).

The place-name log synchronizing module 230 of the portable information terminal 200 refers to the terminal-side place-name logs 221 stored on the terminal-side place-name log storage unit 220, and when the place-name information (sights-candidate place-name information) with the sights candidate flag being set to ON exists, the place-name log synchronizing module 230 calls the place-name log updating API 140 of the video recorder 100, and transmits the place-name information (sights-candidate place-name information) and the time information with the sights candidate flag being set to ON to the place-name log updating API 140 of the video recorder 100 (Step S502).

The place-name log updating API 140 of the video recorder 100 obtains, from the place-name log synchronizing module 230 of the portable information terminal 200, the place-name information (sights-candidate place-name information) and the time information with the sights candidate flag being set to ON, and records them on the recorder-side place-name logs 151 stored on the recorder-side place-name log storage unit 150, as the sights-candidate place-name information 151a and the time information 151b (Step S503).

[Program Recording Operation]

Figure 20:
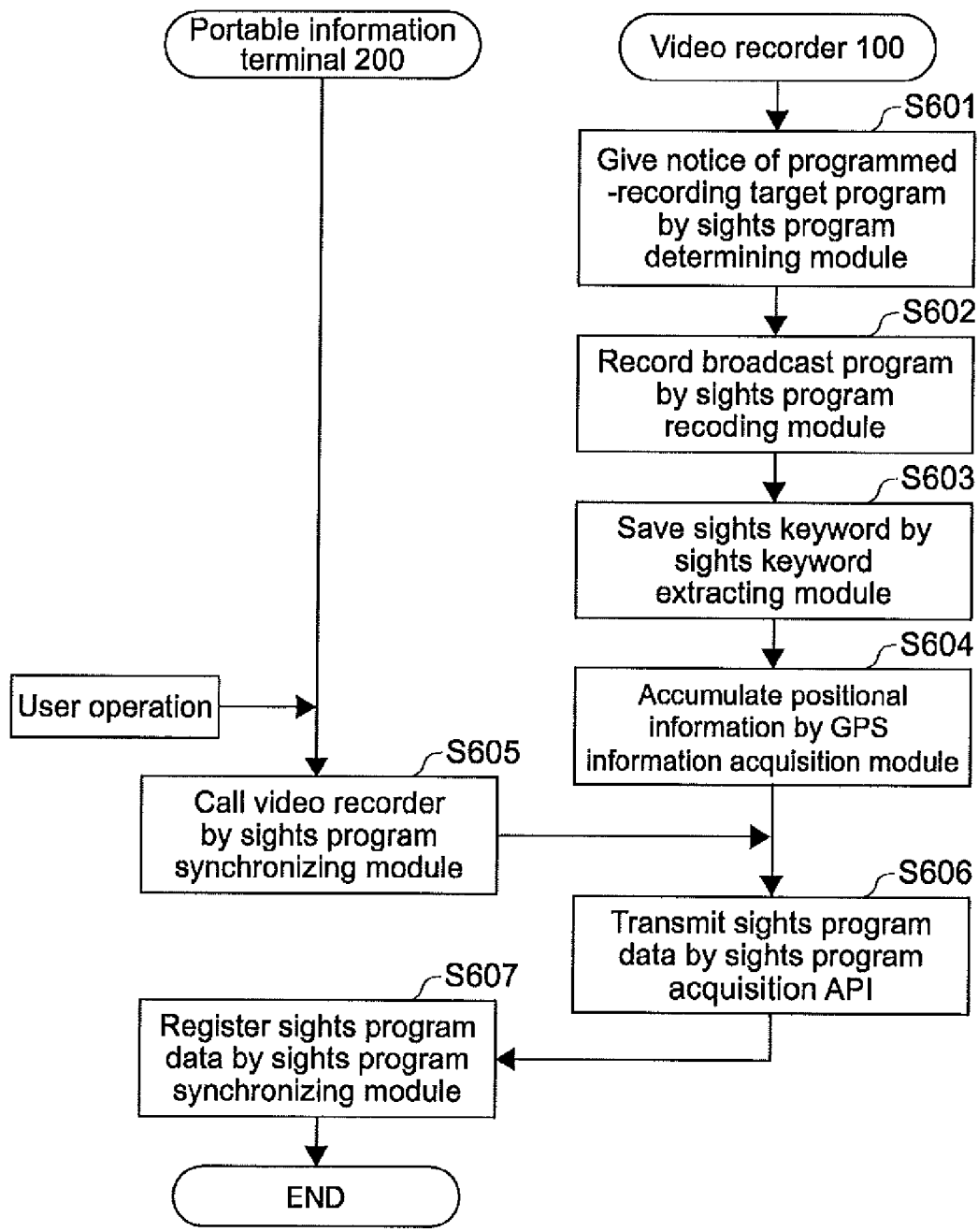
FIG. 20 is a flowchart showing a program recording operation.

FIG. 20 is a flowchart showing the program recording operation.

The sights program determining module 161 of the sights program monitoring module 160 of the video recorder 100 obtains the EPG data via the Internet 10. Based on the genre information associated with the EPG data, the sights program determining module 161 detects a program related to the sights, and divides the program information extracted from the EPG data into morphemes. Then, the sights program determining module 161 compares each of the morphemes with the sights-candidate place-name information 151a recorded on the recorder-side place-name logs 151 stored on the recorder-side place-name log storage unit 150. When the sights program determining module 161 determines, through the above-mentioned comparison, that a morpheme corresponding to the sights-candidate place-name information 151a recorded on the recorder-side place-name logs 151 exists, the sights program determining module 161 notifies the sights program recording module 110 of the program as the programmed-recording target program (Step S601).

When receives the notice, the program recording module 111 of the sights program recording module 110 of the video recorder 100 records the entity data of the broadcast program determined as the programmed-recording target program on the content storage unit 1111, and extracts the caption data multiplexed in the entity data of the broadcast program. Then, the program recording module 111 saves them as the already-recorded-program caption data 1112a on the caption data saving unit 1112. Further, the program recording module 111 extracts data related to the already-recorded broadcast program from the EPG data, generates it as the recording-history data 1113a, and saves it on the recording-history data saving unit 1113 (Step S602).

The sights keyword extracting module 112 of the sights program recording module 110 of the video recorder 100 divides the already-recorded-program caption data 1112a and the recording-history data 1113a, which are respectively saved by the program recording module 111 on the caption data saving unit 1112 and the recording-history data saving unit 1113, into morphemes. Then, the sights keyword extracting module 112 compares each of the morphemes (keyword 1114) with each of the standard sights words 1115a stored on the sights word dictionary 1115. The sights keyword extracting module 112 determines, through the above-mentioned comparison, the morphemes (keywords 1114) corresponding to the standard sights words 1115a stored on the sights word dictionary 1115, as the sights keywords 1116a being valid words. The sights keyword extracting module 112 saves the sights keywords 1116a on the sights keyword saving unit 1116.

The sights keyword extracting module 112 extracts information to be saved on the recorder-side sights program database 120 from the already-recorded-program caption data 1112a saved on the caption data saving unit 1112, the recording-history data 1113a saved on the recording-history data saving unit 1113, and the sights keywords 1116a saved on the sights keyword saving unit 1116. In this case, the sights keyword extracting module 112 saves all of the sights keywords 1116a, which are saved on the sights keyword saving unit 1116, on the recorder-side sights program database 120, while the sights keywords being associated with the program ID, the time of the sights keyword (caption times), the play URL, and the like of the program being the extraction source of the sights keyword.

The address acquisition module 1131 of the GPS information acquisition module 113 of the sights program recording module 110 of the video recorder 100 searches for the sights keywords 1116a saved on the sights keyword saving unit 1116 by the sights keyword extracting module 112, by utilizing an address information service on the Internet 10.

The positional information acquisition module 1132 of the GPS information acquisition module 113 of the sights program recording module 110 of the video recorder 100 searches for the latitude and longitude information 1132a corresponding to the addresses 1131a obtained by the address acquisition module 1131 by utilizing the GPS information service on the Internet 10, and registers the latitude and longitude information 1132*a* corresponding to the addresses 1131*a* on the recorder-side sights program database 120 (Step S604).

On the other hand, the sights program synchronizing module 250 of the portable information terminal 200 receives the operation by the user, and then calls the sights program acquisition API 130 of the video recorder 100 by the use of the HTTP request (Step S605).

When receives the call, the sights program acquisition API 130 of the video recorder 100 generates the sights program data in the XML format from the sights program data accumulated in the recorder-side sights program database 120, and sends back it to the sights program synchronizing module 250 of the portable information terminal 200 via the Internet 10 (Step S606).

The sights program synchronizing module 250 of the portable information terminal 200 extracts the respective data elements clarified by the use of tags based on the XML data form the sights program acquisition API 130 of the video recorder 100, and registers them on the terminal-side sights program database 240 (Step S607).

[Already-Recorded-Program Reproducing Operation]

Figure 21:
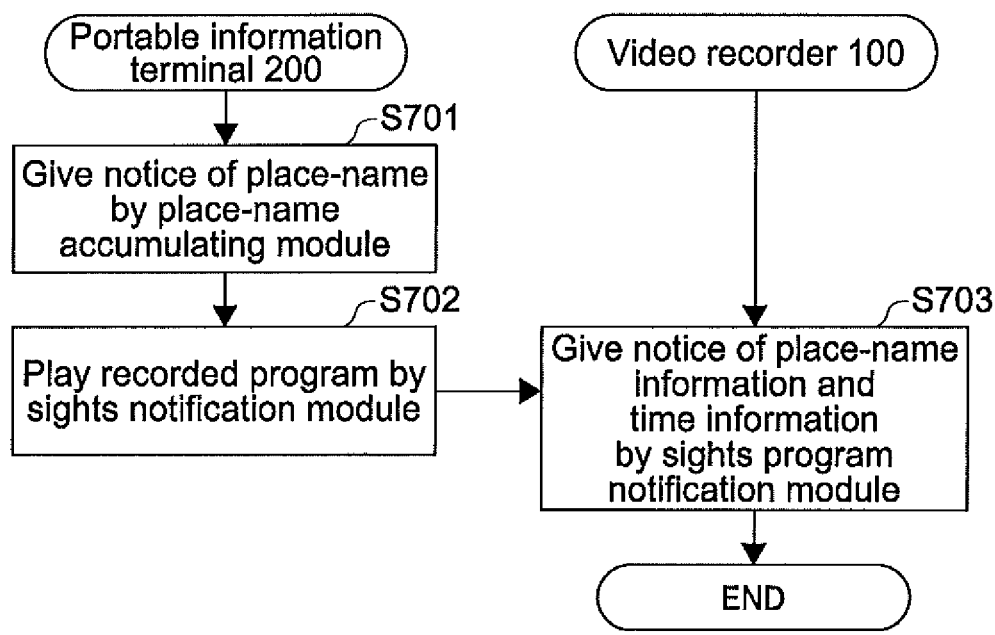
FIG. 21 is a flowchart showing an already-recorded-program reproducing operation.

FIG. 21 is a flowchart showing the already-recorded-program reproducing operation.

The place-name accumulating module 210 of the portable information terminal 200 uses the GPS function to regularly obtain the positional information. Further, the place-name accumulating module 210 obtains the place-name information corresponding to the positional information by utilizing the service on the web, to thereby update the place-name logs of the terminal-side place-name log storage unit 220. Further, the place-name accumulating module 210 removes place-name information appearing on a regular basis or on a continuous basis in time in the terminal-side place-name logs 221. When the place-name corresponding to the current positional information is place-name information other than the place-name information appearing on a regular basis or on a continuous basis in time in the terminal-side place-name logs 221, the place-name accumulating module 210 narrows down the place-name information corresponding to the current positional information as a sights candidate, and extracts it as the sights-candidate place-name information. Then, the place-name accumulating module 210 sets, with respect to the terminal-side place-name logs 221, flag information indicating that the place-name information corresponding to the current positional information is the sights candidate. In addition, the place-name accumulating module 210 determines whether the narrowed-down sights-candidate place-name information (place-name corresponding to current positional information) is registered on the terminal-side sights program database 240, and, in the case where the narrowed-down sights-candidate place-name information is registered, notifies the sights notification module 260 of its keyword and the sights-related information 241 (program ID, time code, play URL, GPS information) (Step S701).

When receives the notice, the sights notification module 260 of the portable information terminal 200 searches for the sights-related information 241 corresponding to the current location of the user (portable information terminal 200) from the terminal-side sights program database 240 based on the positional information obtained by the use of the GPS function of the place-name accumulating module. Then, the sights notification module 260 notifies the user of the fact that the recorded program related to the sights is recorded on the video recorder 100 and this recorded program can be obtained from the video recorder 100 and can be reproduced in the portable information terminal 200. When the user selects a play, the sights notification module 260 obtains the recorded program indicated by the use of the play URL included in the sights-related information 241, which is notified at Step S701 by the place-name accumulating module 210, from the video recorder 100 via the Internet 10, and reproduces the obtained recorded program from the appearing time indicated by the use of the time code included in the sights-related information 241 or from the start of the program (Step S702).

When the program recorded on the content storage unit 1111 is reproduced in the portable information terminal 200, the sights program notification module 162 of the sights program monitoring module 160 of the video recorder 100 divides the already-recorded-program caption data 1112*a* about the program, which is saved on the caption data saving unit 1112, into morphemes. Then, the sights program notification module 162 compares each of the morphemes with the sights-candidate place-name information 151*a* recorded on the recorder-side place-name logs 151 stored on the recorder-side place-name log storage unit 150. When the sights program notification module 162 determines, through the above-mentioned comparison, that a morpheme corresponding to the sights-candidate place-name information 151*a* recorded on the recorder-side place-name logs 151 exists, the sights program notification module 162 notifies the user of the corresponding sights-candidate place-name information 151*a* and the time information 151*b* associated with the sights-candidate place-name information 151*a* by displaying a pop-up window (Step S703).

Next, the description will be made of a hardware configuration of the video recorder 100 and the portable information terminal 200.

[Hardware Configuration of Video Recorder 100]

Figure 22:
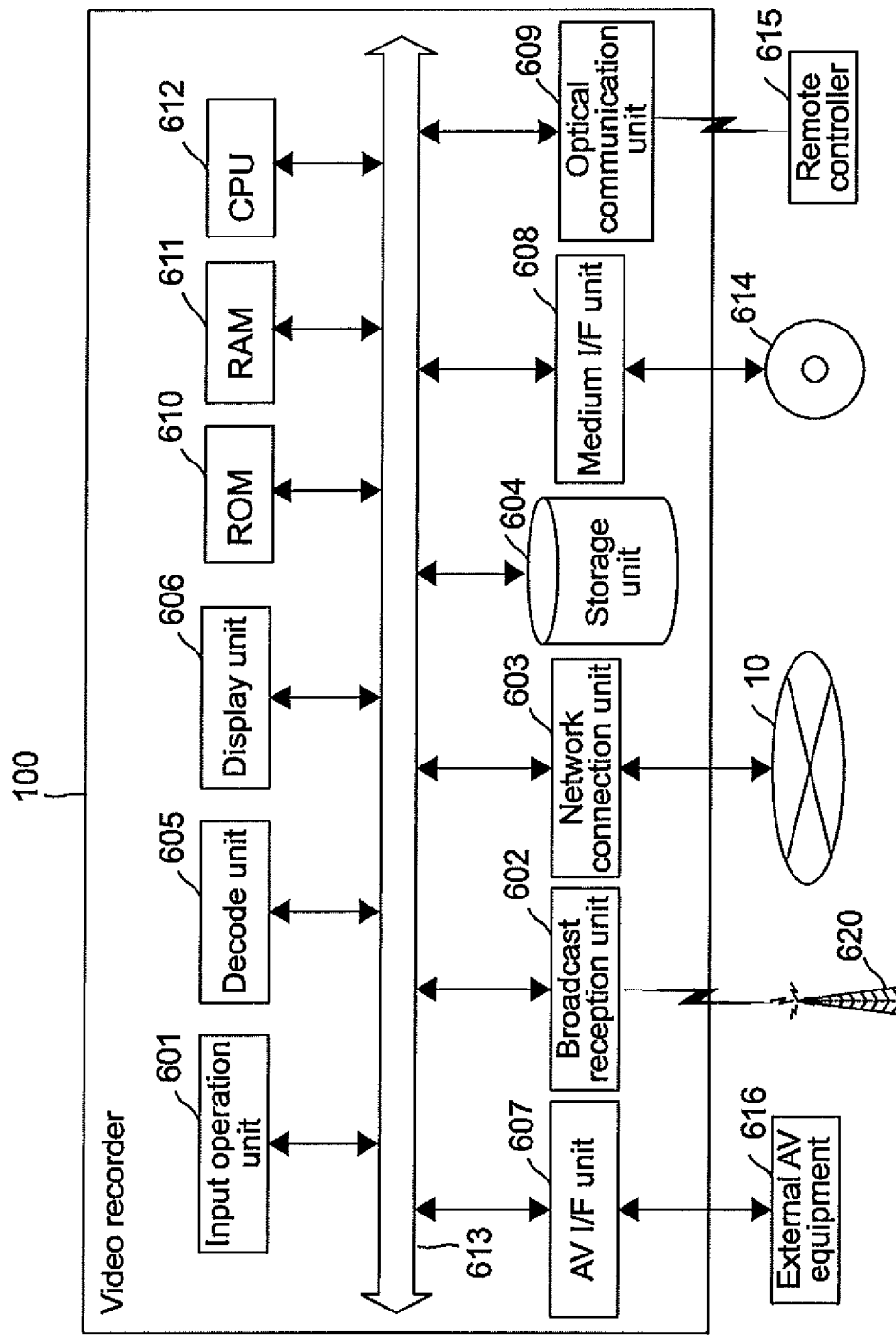
FIG. 22 is a block diagram showing a hardware configuration of the video recorder 100.

FIG. 22 is a block diagram showing the hardware configuration of the video recorder 100.

In the video recorder 100, a central processing unit (CPU) 612 is connected via a system bus 613 to an input operation unit 601, a broadcast reception unit 602, a network connection unit 603, a storage unit 604, a decode unit 605, a display unit 606, an AV interface unit 607, a medium interface unit 608, an optical communication unit 609, a read only memory (ROM) 610, and a random access memory (RAM) 611.

The input operation unit 601 includes various keys. The user uses the input operation unit 601 to process various orders and inputs of data. When the user uses the input operation unit 601 to input the various orders, the orders are supplied via the system bus 613 to the CPU 612.

The broadcast reception unit 602*a* receives, for example, a transport stream provided from each broadcast station 620 such as a terrestrial digital television broadcasting, a CS digital broadcasting, or a BS digital broadcasting.

The network connection unit 603 (connection unit, electronic-program-guide acquisition unit) processes a connection with respect to the Internet 10. The network connection unit 603 receives a transport stream provided from a content providing server (not shown) connected to the video recorder 100 via the Internet 10. Further, the network connection unit 603 obtains the EPG data from an EPG data providing server (not shown) connected to the video recorder 100 via the Internet 10.

The storage unit 604 includes the HDD, the SSD, or the like. On the storage unit 604, content data of the broadcast programs and the like received by the broadcast reception unit 602 and the network connection unit 603 are recoded, for example.

The decode unit 605 decodes data of a content read from the storage unit 604, and restores digital video data and digital audio data. The restored digital video data and digital audio data are supplied via the system bus 613 to the AV interface unit 607.

The display unit 606 includes, for example, a display equipped with a display screen such as a liquid crystal display (LCD), a display control circuit that drives the display, and the like. For example, the display unit 606 checks the orders input by the user and the data and displays various statuses.

The AV interface unit 607 processes input and output of video signals and audio signals with respect to external AV equipment 616 such as a television connected to the video recorder 100.

Into the medium interface unit 608, a removable medium 614 such as an optical disc can be inserted. The medium interface unit 608 is capable of recording the content data of the broadcast programs and the like on the removable medium 614. The removable medium 614 includes, for example, recordable or rewritable DVD and Blu-ray disc.

The optical communication unit 609 is an interface for processing two-way communications with respect to external equipment such as a remote controller. Specifically, the optical communication unit 609 performs a communication with respect to the external equipment, using light such as infrared ray as a wireless medium. Further, wireless media including a radio wave, a sound wave, and an electromagnetic wave may be used other than the light.

The ROM 610 is a read only memory on which programs, data, and the like for a software processing to be executed by the video recorder 100 are permanently stored. It should be noted that the programs may be stored on the storage unit 604.

The RAM 611 is a writable volatile memory to be used for loading a program code to be executed by the CPU 612 and writing working data of the programs.

The CPU 612 generally controls the respective sections of the video recorder 100 and controls a transmission and a reception of the data between the respective sections.

In order to execute the software processing to be executed by the video recorder 100, the CPU 612 loads a desired program from the ROM 610 into the RAM 611, and interprets and executes it.

As described above, the video recorder 100 is configured by the use of typical computer hardware. Further, the programs stored on the ROM 610 cause the computer hardware of the video recorder 100 to function as the respective modules and the DBs shown in FIG. 1.

[Hardware Configuration of Portable Information Terminal 200]

Figure 23:
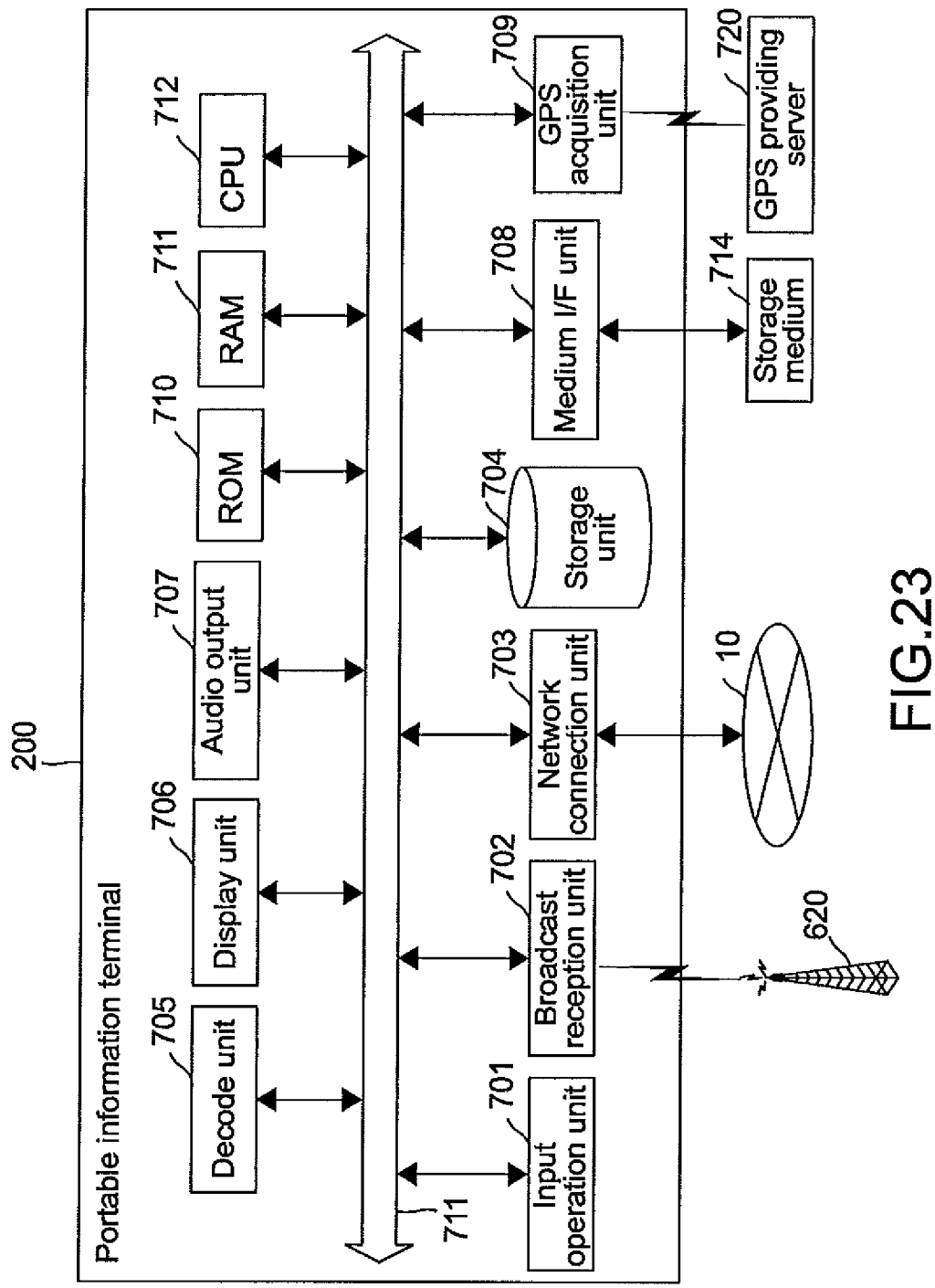
FIG. 23 is a block diagram showing a hardware configuration of the portable information terminal 200.

FIG. 23 is a block diagram showing a hardware configuration of the portable information terminal 200.

In the portable information terminal 200, the CPU 712 is connected via a system bus 713 to an input operation unit 701, a broadcast reception unit 702, a network connection unit 703, a storage unit 704, a decode unit 705, a display unit 706, an audio output unit 707, a medium interface unit 708, a GPS acquisition unit 709, a ROM 710, and a RAM 711.

The input operation unit 701 includes various keys, and processes various orders and inputs of data from the user. When the user uses the input operation unit 701 to input the orders, the orders are supplied through an input interface unit (not shown) via the system bus 713 to the CPU 712.

The broadcast reception unit 702 receives, for example, a broadcast wave provided from each broadcast station 620 such as a terrestrial digital television broadcasting, a CS digital broadcasting, a BS digital broadcasting, or a terrestrial digital television broadcasting for cellular phone, and demodulates video signals and audio signals.

The network connection unit 703 (connection unit) processes a wireless communication with respect to the Internet 10. The network connection unit 703 performs a transmission and a reception with respect to the video recorder 100 via the Internet 10. The network connection unit 703 receives a transport stream provided from a content providing server (not shown) connected via the Internet 10 thereto. Further, the network connection unit 703 receives the EPG data from an EPG data providing server (not shown) connected via the Internet 10 thereto.

The storage unit 704 is, for example, a storage device such as the HDD or the SSD. The storage unit 704 functions as the terminal-side place-name log storage unit 220, the terminal-side sights program database 240.

The decode unit 705 decodes data of a content read from the storage unit 704, and restores digital video data and digital audio data. The restored digital video data is supplied via the system bus 713 to the display unit 706 and displayed. On the other hand, the digital audio data is supplied via the system bus 713 to the audio output unit 707 and output as audio through a speaker.

The display unit 706 includes, for example, a display such as the LCD and a display control circuit that drives the display.

The audio output unit 707 includes a circuit that converts digital audio signals into analog audio signals, the speaker, and the like.

The medium interface unit 708 is an interface that performs a reading and a writing of data such as encrypted program data with respect to a storage medium 714 such as a memory card installing a semi-conductor memory.

The GPS acquisition unit 709 receives and demodulates GPS signals provided from the GPS providing server 720 via a receiving antenna, and, based on the demodulated signals, calculates the current location of the portable information terminal 200.

The ROM 710 is a read only memory on which programs, data, and the like for a software processing to be executed by the portable information terminal 200 are permanently stored. It should be noted that the programs may be stored on the storage unit 704.

The RAM 711 is a writable volatile memory to be used for loading a program code to be executed by the CPU 712 and writing working data of the programs.

The CPU 712 generally controls the above-mentioned respective sections and controls a transmission and a reception of the data between the respective sections. Further, in order to execute the software processing to be executed by the portable information terminal 200, the CPU 712 loads a desired program from the storage unit 704 or the ROM 710 into the RAM 711, and interprets and executes it.

As described above, the portable information terminal 200 is configured by the use of typical computer hardware. Further, the programs stored on the ROM 710 cause the computer hardware of the portable information terminal 200 to function as the respective modules and the DBs shown in FIG. 1.

Second Embodiment

In the above first embodiment, the description has been made of the information processing system 1 including the video recorder 100 that records the broadcast program and the portable information terminal 200 that reproduces the broadcast program recorded on the video recorder 100. In a second embodiment below, the description will be made of a portable information terminal 300 that records the broadcast program and reproduces the recorded broadcast program.

Figure 24:
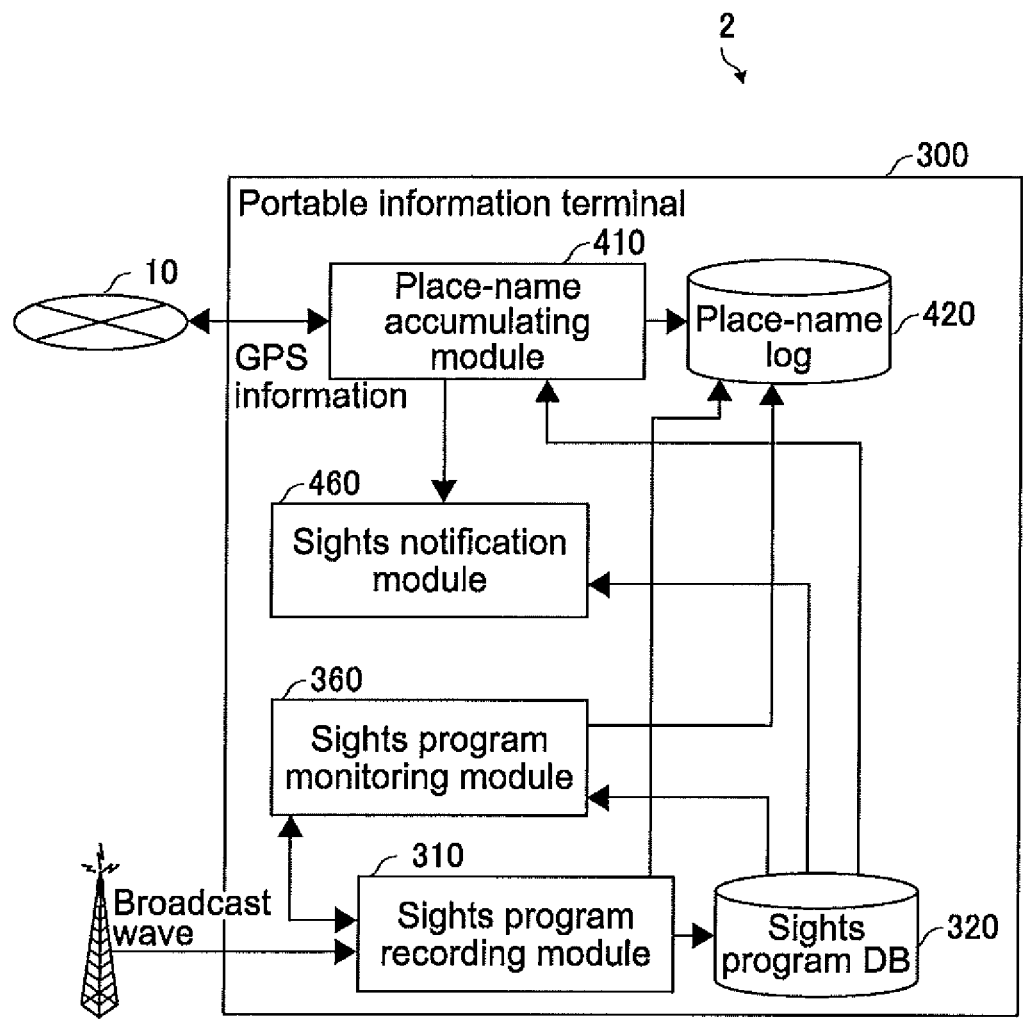
FIG. 24 is a block diagram showing a configuration of a portable information terminal 300 according to a second embodiment of the present disclosure.

FIG. 24 is a block diagram showing a configuration of the portable information terminal 300 according to the second embodiment of the present disclosure.

In the following, the description of the configuration and the functions similar to those of the first embodiment will be simplified or omitted, and different points will be mainly described. In this embodiment, the respective sections of the portable information terminal 300 having the configurations similar to those of the respective sections of the video recorder 100 of the first embodiment are denoted by reference numerals (300 series). Further, the respective sections of the portable information terminal 300 having the configurations similar to those of the respective sections of the portable information terminal 200 of the first embodiment are denoted by corresponding reference numerals (400 series). The duplicated description will be omitted.

[Portable Information Terminal 300]

The portable information terminal 300 (information processing apparatus) is an electronic apparatus capable of connecting to the Internet 10 so as to browse web pages, transmit and receive electronic mails, download content data, receive content data of programs provided through broadcast waves of a terrestrial digital broadcasting and a satellite broadcasting, record the downloaded or received content data on a recording medium, reproduce moving images and music recorded on the recording medium, and utilize other applications. The portable information terminal 300 has a GPS function of regularly receiving the positional information (latitude and longitude information) of the portable information terminal 300. Thus, the portable information terminal 200 is capable of obtaining a place-name by utilizing a place-name search service on the web based on the positional information obtained by the user of this GPS function, to thereby accumulate the history of the place-names of the destinations of the user as the place-name logs. The portable information terminal 300 and the Internet 10 constitute an information processing system 2 of this embodiment.

The portable information terminal 300 includes a sights program recording module 310, a sights program database 320, a place-name accumulating module 410, a place-name log storage unit 420, a sights notification module 460, and a sights program monitoring module 360.

The sights program recording module 310 (content recording unit) records a broadcast program that the user selects or of which the sights program monitoring module 360 notifies the user, extracts the sights keywords from the EPG data of the recorded broadcast program and the caption data multiplexed in the entity data of the program, and registers the extracted sights keywords, the latitude and longitude data of the sights, and the like on the sights program database 320.

The place-name accumulating module 410 (place-name accumulating unit) uses the GPS function to regularly obtain the positional information, and obtains the place-name information corresponding to the current positional information by utilizing the service on the web. Then, the place-name accumulating module 410 updates place-name logs 421 of the place-name log storage unit 420.

Further, when the place-name information corresponding to the current positional information is place-name information other than the place-name information appearing on a regular basis or on a continuous basis in time in the place-name logs 421, the place-name accumulating module 410 (sights keyword determining unit) narrows down the place-name information corresponding to the current positional information as a sights candidate. Then, the place-name accumulating module 410 sets, with respect to the place-name logs 421, flag information indicating that the current place-name information corresponding to the positional information is the sights candidate. In addition, the place-name accumulating module 410 determines whether the narrowed-down sights-candidate place-name information (place-name corresponding to the current positional information) is registered on the sights program database 320 as the sights keyword, and, in the case where the narrowed-down sights-candidate place-name information is registered, notifies the sights notification module 460 of the sights keyword and the sights-related information.

Based on the positional information obtained by the use of the GPS function of the place-name accumulating module 410, the sights notification module 460 (content-record informing unit) searches for the sights-related information corresponding to the current location of the user (portable information terminal 300), from the sights program database 320. Then, the sights notification module 460 notifies the user of the fact that the recorded program related to the sights can be reproduced and viewed in the portable information terminal 300.

The sights program monitoring module 360 detects the program related to the sights on the basis of the EPG data obtained in advance, and requests the sights program recording module 310 to perform a programmed recording of the program. When the user makes a setting that a recording of the sights program is performed in advance, the sights program recording module 310 becomes effective. The effective sights program recording module 310 performs a detection of the program related to the sights based on the EPG data regularly obtained.

Further, when the recorded program is reproduced, the sights program monitoring module 360 divides the caption data about the program into morphemes. When a morpheme corresponds to the place-name information (sights-candidate place-name information) with flag information indicating that it is the sights candidate recorded on the place-name logs 421 stored on the place-name log storage unit 420 being set, the sights program monitoring module 360 notifies the user of the sights-candidate place-name information and the time information associated to the sights-candidate place-name information by displaying a pop-up window.

According to the above-mentioned configuration, as in the first embodiment, without a transferring of the sights-candidate place-name information from the place-name log synchronizing module 230 to the place-name log updating API 140, a transferring of the sights program data from the sights program acquisition API 130 to the sights program synchronizing module 250, and a transferring of the recorded program from the video recorder 100 to the portable information terminal 200, it is sufficient that the portable information terminal 300 execute the processing only within the portable information terminal 300. In addition, it is unnecessary to configure the place-name log synchronizing module 230, the place-name log updating API 140, the sights program acquisition API 130, and the sights program synchronizing module 250.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
 a first information processing apparatus; and
 a second information processing apparatus configured to be connectable via a network to the first information processing apparatus, wherein the first information processing apparatus
includes:
a content storage unit configured to obtain and record a
sights keyword related to stored content, and
the second information processing apparatus includes:
a place-name accumulating unit configured to obtain and
accumulate place-name information corresponding to a
current location of the second information processing
apparatus,
in which, for each instance the place-name information is
obtained, the place-name information is added as a piece
of log information to a place-names log with recording
time information indicating in time sequence when the
place-name information is added to the place-names log,
a sights keyword acquisition unit configured to obtain the
sights keyword recorded on the first information processing apparatus,
a sights keyword determining unit configured to narrow
down a sights candidate in the place-name information
of the place-names log, to thereby extract sights-candidate place-name information, and to determine the
sights keyword corresponding to the sights-candidate
place-name information, and
a content-record informing unit configured to inform that
content related to the determined sights keyword is
recorded on the first information processing apparatus;
wherein the narrowing down of the sights candidate in the
place-name information includes removing from the
place-names log each piece of the log information corresponding to any place-name information appearing on
a regular basis in time in the place-names log.

2. The information processing system according to claim 1, wherein the first information processing apparatus further includes an electronic-program-guide acquisition unit configured to obtain electronic program guide data including information about a plurality of contents, and the content storage unit performs at least one of (i) an extraction of the sights keyword from caption data included in the stored content or (ii) an extraction of the sights keyword from the information about content in the electronic program guide data obtained by the electronic-program-guide acquisition unit.

3. The information processing system according to claim 1, wherein the place-name accumulating unit obtains a global positioning system (GPS) information corresponding to the current location of the second information processing apparatus, and obtains the place-name information based on the obtained GPS information.

4. The information processing system according to claim 1, wherein the second information processing apparatus further includes a reproduction unit configured to obtain via the network the content stored on the first information processing apparatus and to reproduce the content.

5. The information processing system according to claim 4, wherein the first information processing apparatus further includes:
a place-name information determining unit configured to extract place-name information from caption data included in the content to be reproduced by the reproduction unit of the second information processing apparatus, as caption place-name information, to thereby determine caption place-name information corresponding to the sights-candidate place-name information, and
a place-name information informing unit configured to inform that the determined caption place-name information is included in the content to be reproduced by the reproduction unit.

6. The information processing system according to claim 1, wherein the first information processing apparatus further includes:
a place-name acquisition unit configured to obtain the sights-candidate place-name information from the second information processing apparatus, and
a programmed-recording unit configured to detect information about the content including the sights-candidate place-name information from electronic program guide data obtained by an electronic-program-guide acquisition unit, and to carry out a programmed recording based on the detected information about the content.

7. The information processing system according to claim 1, wherein the sights keyword determining unit sets flag information in response to determining the sights keyword corresponding to the sights-candidate place-name information.

8. The information processing system according to claim 1, wherein informing that content related to the determined sights keyword is recorded on the first information processing apparatus comprises displaying a pop-up window on the second information processing apparatus.

9. An information processing terminal, comprising:
a content storage unit configured to store content and to obtain and record a sights keyword related to the stored content;
a place-name accumulating unit configured to obtain and accumulate place-name information corresponding to a current location of the information processing terminal,
in which, for each instance the place-name information is obtained, the place-name information is added as a piece of log information to a place-names log with recording time information indicating in time sequence when the place-name information is added to the place-names log; and
a sights keyword determining unit configured to narrow down a sights candidate in the place-name information of the place-names log, to thereby extract sights-candidate place-name information, and to determine the sights keyword corresponding to the sights-candidate place-name information;
wherein narrowing down the sights candidate in the place-name information includes removing from the place-names log each piece of the log information corresponding to any place-name information appearing on a regular basis in time in the place-names log.

10. The information processing terminal according to claim 9, further comprising:
a sights keyword acquisition unit configured to obtain the sights keyword recorded on the content storage unit, and
a content-record informing unit configured to inform that content related to the determined sights keyword is recorded on the first information processing apparatus.

11. The information processing terminal according to claim 9, further comprising:
a programmed-recording unit configured to detect information about content including the sights-candidate place-name information from electronic program guide data obtained by an electronic-program-guide acquisition unit, and to carry out a programmed recording based on the information about the detected content.

12. An information processing method, comprising:
storing a sights keyword related to stored content;
obtaining and accumulating place-name information corresponding to a current location of an information processing apparatus to construct a place-names log,
in which, for each instance the place-name information is obtained, the place-name information is added as a piece of log information to the place-names log with recording time information indicating in time sequence when the place-name information is added to the place-names log;

narrowing down a sights candidate from the place-names log to extract sights candidate place-name information; and determining a sights keyword corresponding to the sights-candidate place-name information;

wherein narrowing down the sights candidate from the place-names log includes removing from the place-names log each piece of the log information corresponding to any place-name information appearing on a regular basis in time in the place-names log.

13. The method according to claim 12, further comprising:
informing a user that content related to the determined sights keyword is stored.

14. The method according to claim 12, further comprising:
detecting information about content including sights-candidate place-name information from electronic-program-guide data; and carrying out a programmed recording based on the information about the detected content.

\* \* \* \* \*